Nov. 30, 1954   C. H. KAMAN ET AL   2,695,674
CONTROL SYSTEM FOR MULTIPLE ROTOR HELICOPTERS
Filed Sept. 14, 1949                                     7 Sheets-Sheet 1
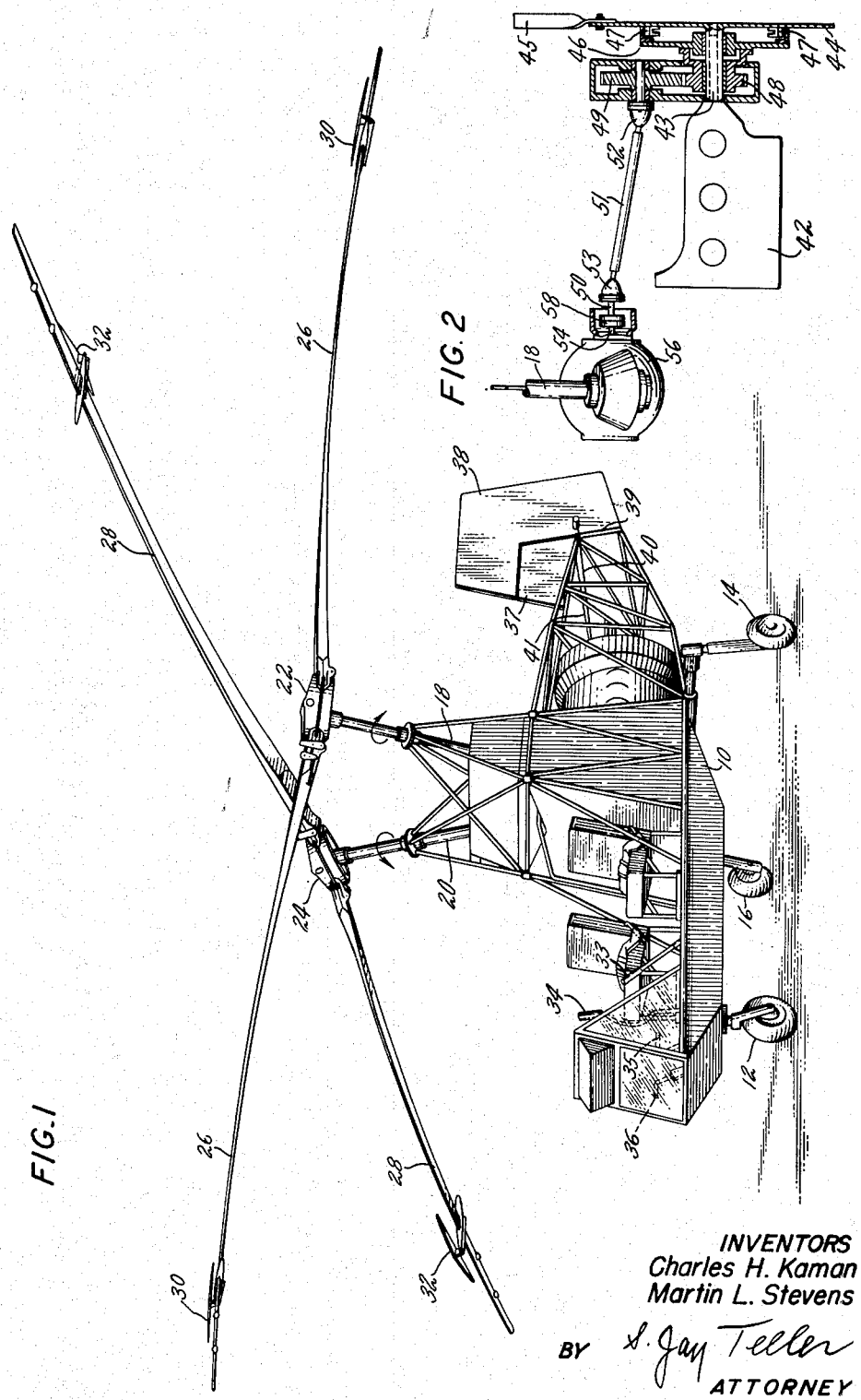
INVENTORS
Charles H. Kaman
Martin L. Stevens
BY S. Jay Teller
ATTORNEY

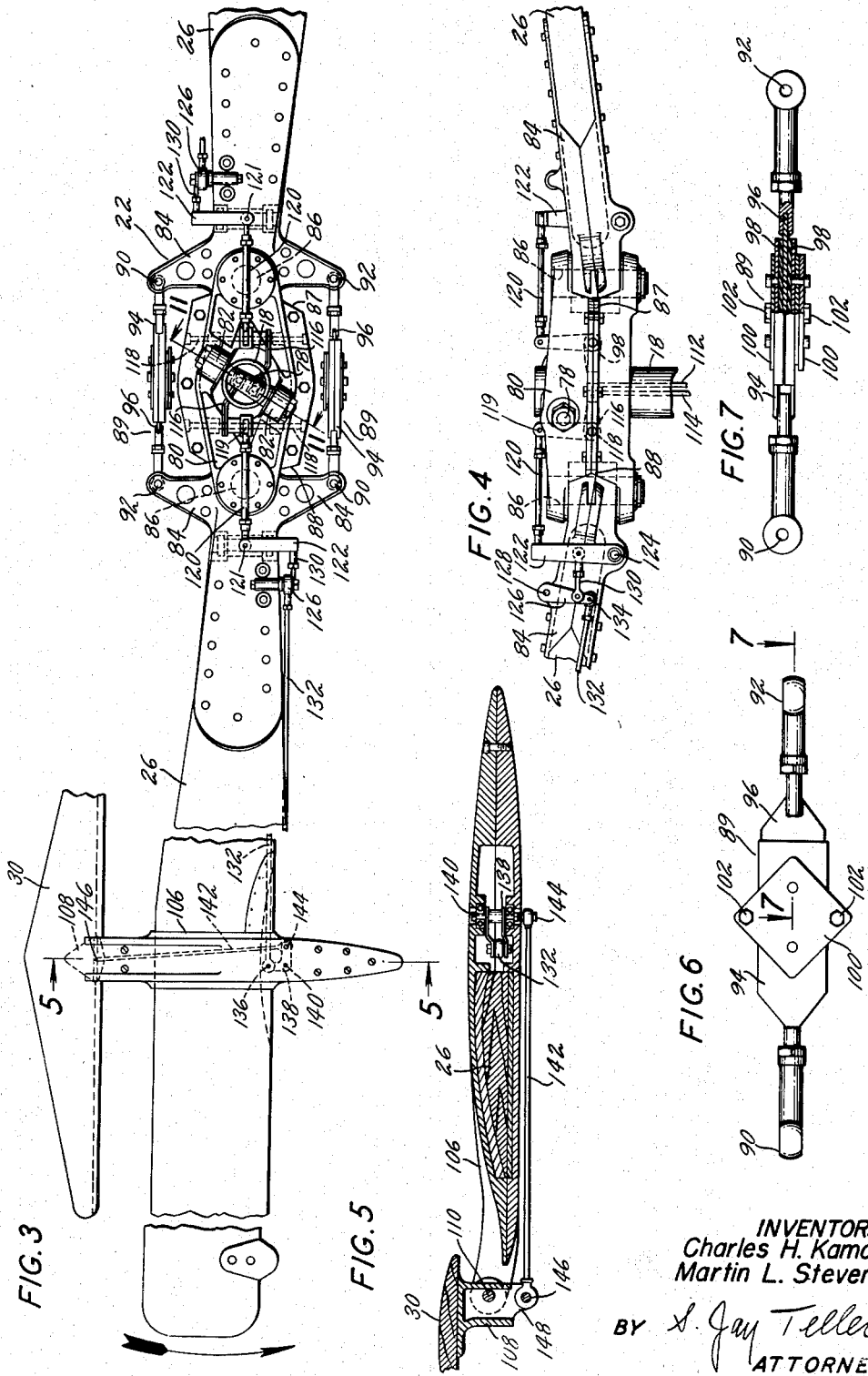

Nov. 30, 1954

C. H. KAMAN ET AL 2,695,674

CONTROL SYSTEM FOR MULTIPLE ROTOR HELICOPTERS

Filed Sept. 14, 1949

INVENTORS
Charles H. Kaman
Martin L. Stevens

BY *S. Jay Teller*

ATTORNEY

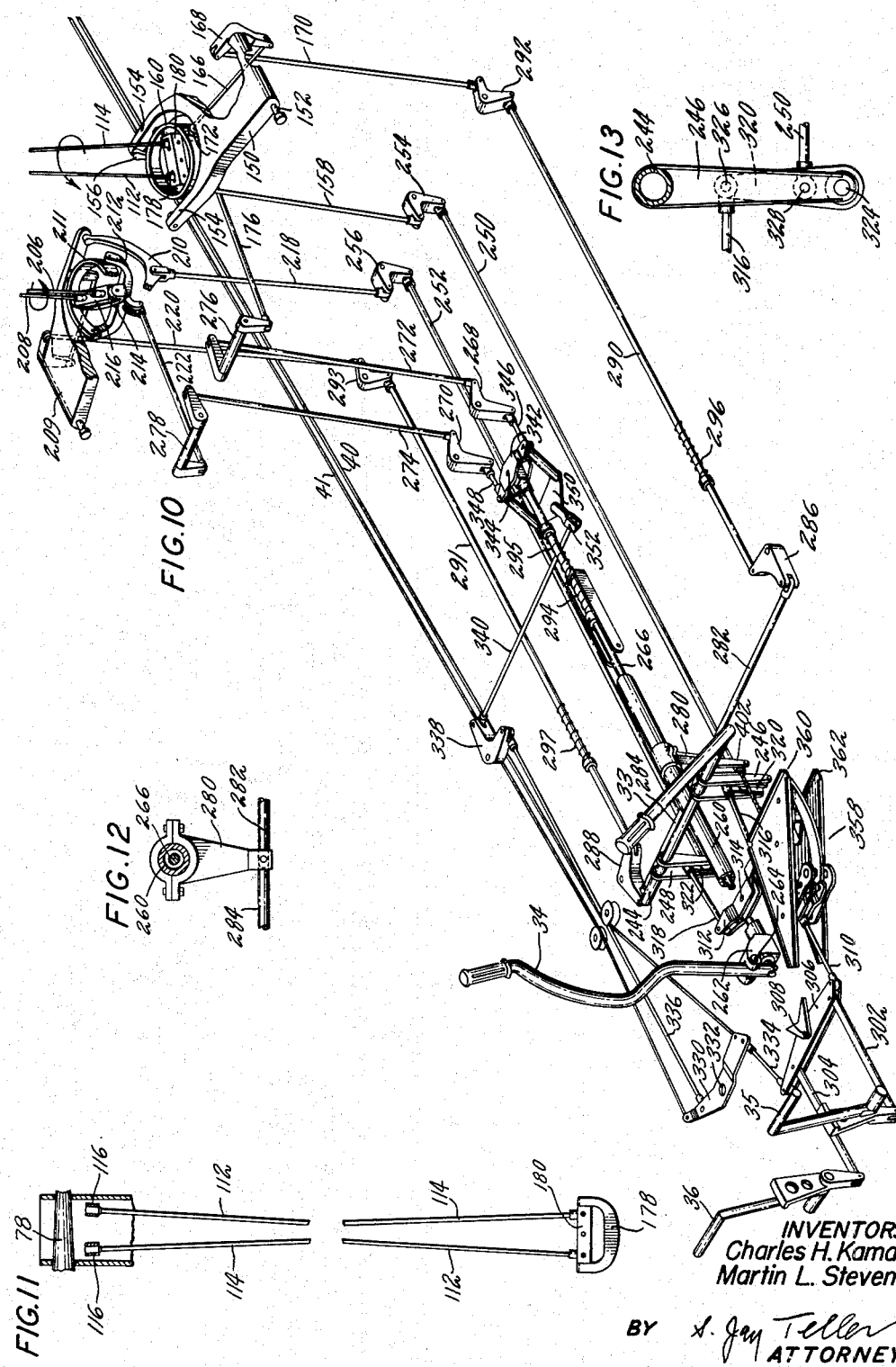

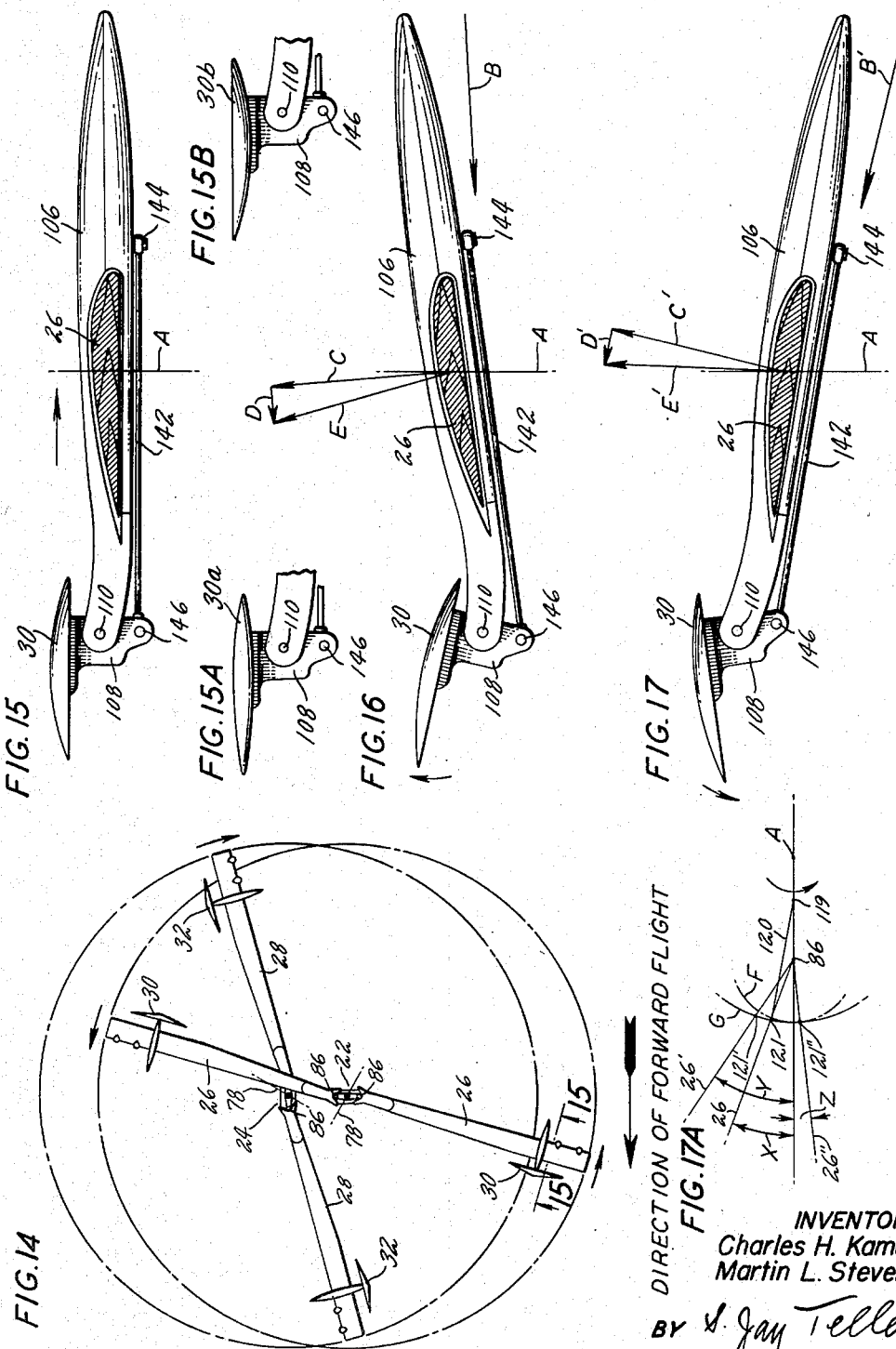

Nov. 30, 1954
C. H. KAMAN ET AL
2,695,674
CONTROL SYSTEM FOR MULTIPLE ROTOR HELICOPTERS
Filed Sept. 14, 1949
7 Sheets-Sheet 6
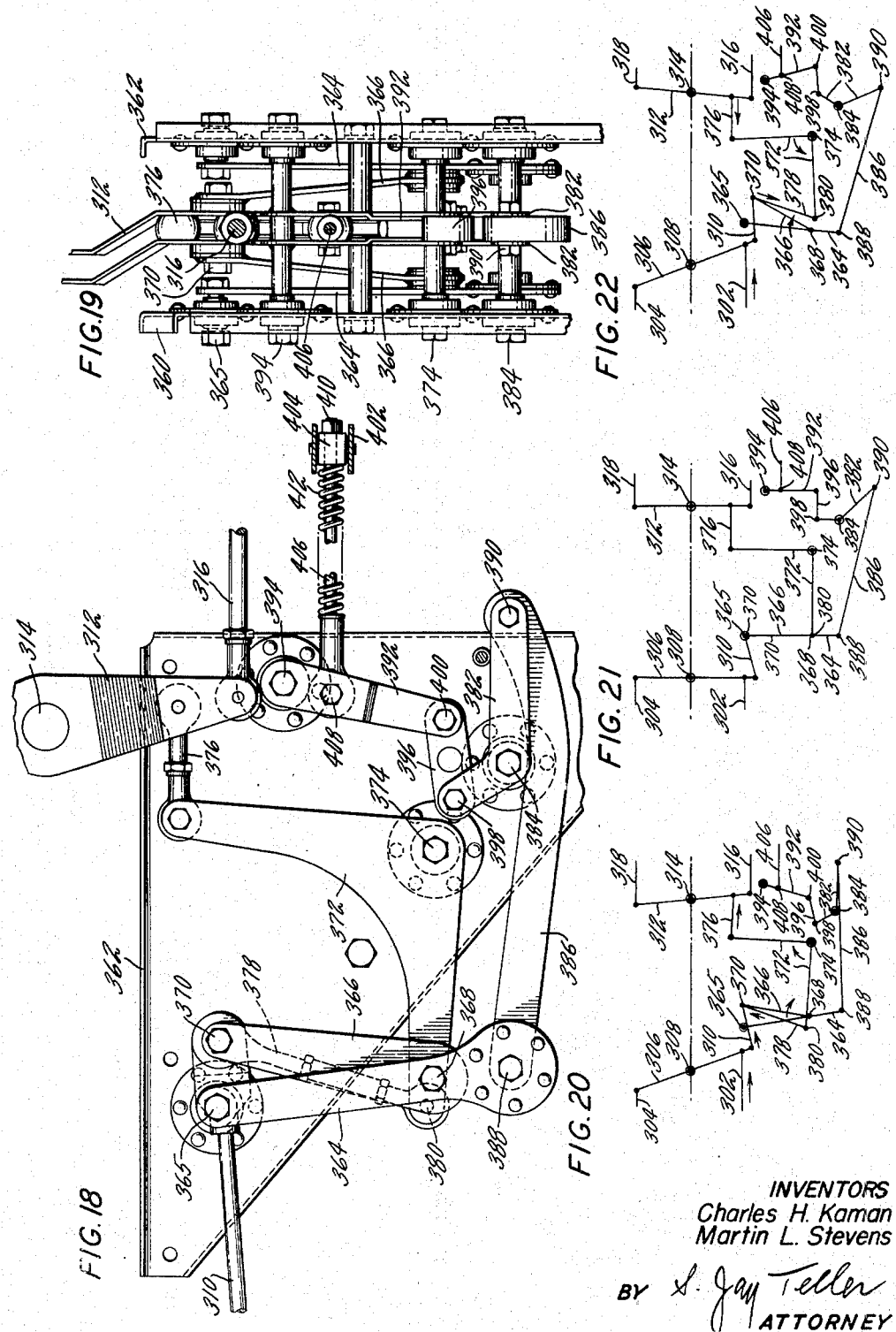
INVENTORS
Charles H. Kaman
Martin L. Stevens
BY S. Jay Teller
ATTORNEY

United States Patent Office 2,695,674
Patented Nov. 30, 1954

2,695,674

CONTROL SYSTEM FOR MULTIPLE ROTOR HELICOPTERS

Charles H. Kaman and Martin L. Stevens, Simsbury, Conn., assignors to The Kaman Aircraft Corporation, Bloomfield, Conn., a corporation of Connecticut Application September 14, 1949, Serial No. 115,749

31 Claims. (Cl. 170—135.24)

The invention relates to helicopters and more particularly to helicopters having two lifting rotors. As to some of its aspects, the invention relates to helicopters of the type set forth in the Kaman Patent No. 2,455,866 dated December 7, 1948.

A helicopter as disclosed in the said patent has two rotors rotatable in opposite directions about substantially vertical axes, the axes of the rotors preferably being spaced horizontally and also transversely of the direction of normal flight.

One object of the invention is to provide a helicopter of the type last above-specified having pilot controlled mechanism for controlling the direction of flight by differentially changing the collective pitches of the two rotors, which pilot controlled mechanism is operable in the same predetermined manner for normal flight and for autorotative descent.

A further object of the invention is to provide a helicopter of the said type provided with differential collective pitch changing mechanism as last above-mentioned and also provided with pilot controlled mechanism for differentially changing the cyclic pitches of the blades for controlling the direction of flight.

Other objects of the invention will be apparent from the drawings and from the following description and claims.

Various features of the control mechanism as disclosed are not herein claimed, some of these features being set forth and claimed in the copending application of Charles H. Kaman, Serial No. 731,656, filed February 28, 1947, for Aircraft of the Rotary Wing Type, now Patent No. 2,668,595 dated February 9, 1954.

The drawings show in detail a presently preferred embodiment of the invention, but it will be understood that various changes may be made from the construction shown and that the drawings are not to be construed as defining or limiting the scope of the invention, the claims being relied upon for that purpose.

Of the drawings:

Fig. 1 is a perspective view of a helicopter embodying the invention.

Fig. 2 is a fragmentary schematic view showing a portion of the power mechanism for driving the rotors.

Fig. 3 is a fragmentary plan view of the rotor hub mechanism at the left side of the helicopter, together with one of the rotor blades and the parts carried thereby.

Fig. 4 is a front view of the rotor hub mechanism as shown in Fig. 3, but with certain parts omitted for clarity.

Fig. 5 is an enlarged vertical sectional view taken along the line 5—5 of Fig. 3.

Fig. 6 is an enlarged front view of a portion of the mechanism shown in Figs. 3 and 4.

Fig. 7 is a combined plan and sectional view of the mechanism shown in Fig. 6, the section being taken along the line 7—7 of Fig. 6.

Fig. 8 is a combined elevational and vertical sectional view on a scale larger than that of Figs. 3 and 4, this view being taken from the front and showing a portion of the drive mechanism for the rotor shafts and also showing the azimuth mechanism associated with one of the rotor shafts.

Fig. 9 is a combined plan and sectional view taken along the line 9—9 of Fig. 8.

Fig. 10 is a schematic perspective view of the major portion of the pilot operable control mechanism.

Fig. 11 is a schematic view taken along the line 11—11 of Fig. 3 and showing parts of the control mechanism.

Fig. 12 is a front view of certain parts of the control mechanism as shown in Fig. 10.

Fig. 13 is an enlarged fragmentary side view of certain parts of the control mechanism as shown in Fig. 10.

Fig. 14 is a schematic plan view of the two rotors of the helicopter.

Fig. 15 is a schematic view illustrating the initial positions of one of the blades and the corresponding flap, this view being taken along the line 15—15 of Fig. 14 and the blade and flap being in the same positions as in Fig. 5.

Figs. 15A and 15B are fragmentary views similar to Fig. 15, but showing alternative flap shapes.

Figs. 16 and 17 are views similar to Fig. 15 but illustrating the blade and flap in different positions.

Fig. 17A is a diagrammatic view illustrating the automatic collective pitch adjustment for one of the rotors.

Fig. 18 is a plan view of the motion reversing mechanism forming a portion of the control mechanism as shown in Fig. 10.

Fig. 19 is a right end view of the mechanism shown in Fig. 18.

Figs. 20, 21 and 22 are diagrammatic views illustrating the action of the reversing mechanism shown in Figs. 18 and 19, these views respectively showing the parts in direct control positions, in neutral positions and in reverse control positions.

General organization

Figure 23:
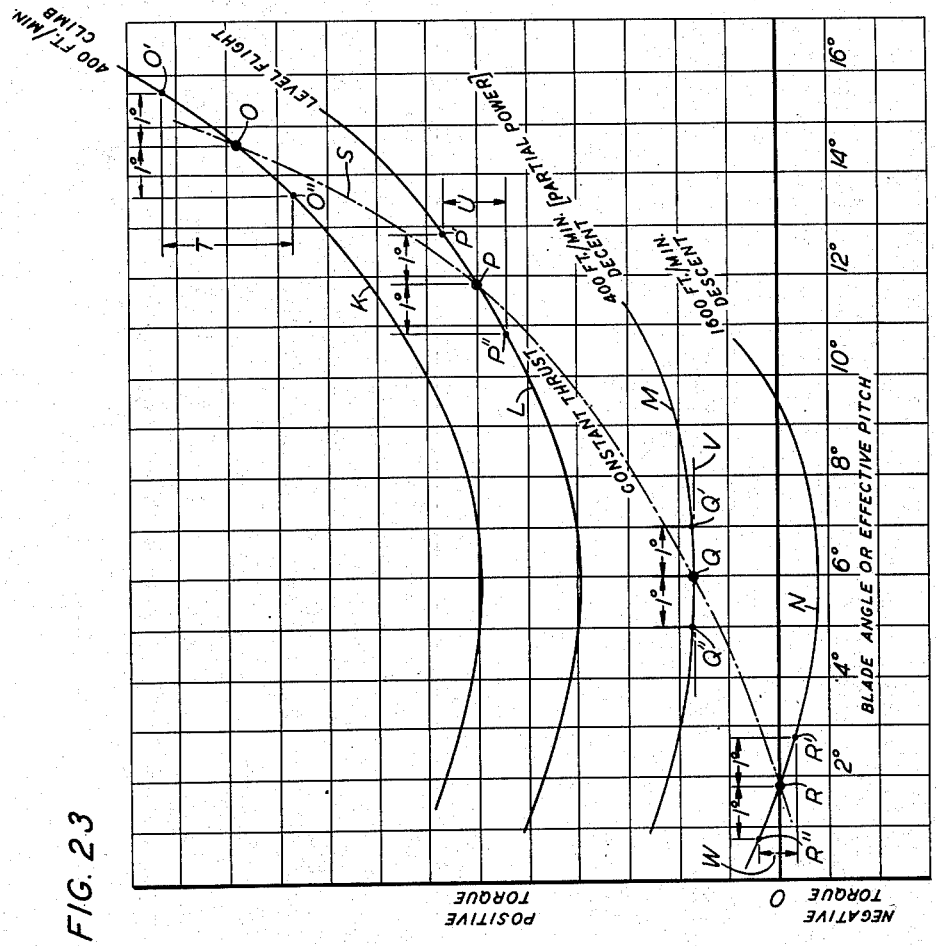
Fig. 23 is a chart illustrating certain principles involved in the operation of the helicopter.

Fig. 1 of the drawings shows a helicopter embodying the invention, this view being taken from the front and left. As shown, the helicopter has two rotary wings or rotors having their axes spaced transversely and having their blades in intermeshing relationship. While this arrangement of rotors is preferred and has important advantages, the present invention, as to certain of its aspects, is not limited to the said rotor relationship.

The helicopter as illustrated comprises a fuselage 10 provided with landing wheels 12 and 14, 16. Rotatably mounted in suitable bearings in the fuselage are two supporting and driving shafts 18 and 20 having their axes in a transverse vertical plane. The said shafts are preferably inclined and diverged upwardly as shown. The shafts 18 and 20 are preferably hollow and are provided respectively at their upper ends with hub structures 22 and 24 respectively connected with aerofoil blades 26, 26 and 28, 28. Mounted within the fuselage is a suitable power plant and power transmitting mechanism for driving the shafts and rotors, these parts being shown schematically in Fig. 2. Preferably, the blades 26, 26 are provided with relatively movable servo flaps 30, 30 and similarly the blades 28, 28 are provided with relatively movable servo flaps 32, 32. The shaft 18 and its associated parts are at the left side of the helicopter and the shaft 20 and its associated parts are at the right side of the helicopter. Each hub structure with its connected blades and flaps constitutes a rotor. The two shafts are connected for rotation in unison and in opposite directions. Viewed from the top as illustrated diagrammatically in Fig. 14, the shaft and rotor at the left rotate counter-clockwise and the shaft and rotor at the right rotate clockwise.

As shown, each rotor has two blades and there are important advantages in the provision of two blades as will presently appear. However, the invention as to some of its aspects is not limited to the use of two blades and a different number may be used. The two shafts 18 and 20 are connected to the power plant so that they are rotated thereby in synchronism but in opposite directions. The blades 28, 28 and the hub structure 24 and the other parts of one rotor are similar to the blades 26, 26 and the hub structure 22 and the other parts of the other rotor except that these various parts are oppositely positioned and shaped to conform to the respective directions of rotation. The two rotors are so connected with the respective shafts 18 and 20 that the blades on one rotor are longitudinal when those on the other rotor are transverse. This arrangement, together with the diverging inclinations of the shafts 18 and 20 enables the blades of the two rotors to intermesh and to clear each other as they are rotated. The rotation of the rotors in opposite directions normally avoids any tendency for the reactive forces to turn the aircraft, as these reactive forces, being in opposite directions, neutralize each other.

Notwithstanding the inclinations of the shafts 18 and 20 they will for convenience be sometimes referred to as "vertical" and certain parts carried by the shafts and perpendicular thereto will for convenience be sometimes referred to as "horizontal."

Control sticks 33 and 34 are provided for changing the pitches of the blades, these being positioned for convenient engagement respectively by the left hand and the right hand of the pilot. Foot pedals 35 and 36 are positioned for engagement respectively by the left foot and the right foot of the pilot. The fuselage is provided at the rear with a stabilizer which is shown as comprising a fixed pin 37 and a rudder 38 pivoted for movement about a substantially vertical axis at 39. The foot pedals 35 and 36 are connected with the rudder 38 by suitable mechanism including cables 40 and 41.

*Drive mechanism for rotors*

Fig. 2 shows schematically the motor and a portion of the power transmitting mechanism for driving the shafts 18 and 20 and the rotors connected therewith, this view being taken from the left side of the helicopter. The motor is represented at 42, this being at the rear of the shafts 18 and 20. Connected with the main shaft 43 of the motor at the rear end thereof is a disc 44 carrying fan blades 45. Rotatably mounted on the shaft 43 is a drum 46 having an internal friction face. Centrifugally acting shoes 47, 47 are carried by the disc 44 and these automatically engage the drum 46 when the motor reaches a predetermined speed. When the motor is operating at a lower idling speed, the shoes 47, 47 do not engage the drum 46 and the drum is stationary.

Power transmitting mechanism is connected with the motor and the rotors and interposed between them for driving the rotors in the proper predetermined directions. This mechanism enables the rotors to rotate automatically in the said predetermined directions independently of power derived from the motor. As shown, a gear 48 is connected with the drum 46, the said gear meshing with a gear 49. The gear 49 is connected with a longitudinal shaft 50 by means of a drive shaft 51 and universal joints 52 and 53. Aligned with the shaft 50 is a shaft 54 which is connected with the shafts 18 and 20 by gearing located in a housing 56. Power is transmitted from the shaft 50 to the shaft 54 by means of a uni-directional clutch 58. The clutch 58 permits the shafts 18 and 20 and the rotors to rotate in their normal directions independently of the shaft 50 and of the various other parts connected therewith including the motor.

Fig. 8 shows the gear housing 56 which has already been referred to in connection with Fig. 2. Mounted in suitable bearings within the housing 56 is a transverse horizontal shaft 60, a bevel gear 62 being secured to the said shaft. The bevel gear 62 meshes with a bevel gear 64 on the before-mentioned longitudinal horizontal shaft 54. Secured to the shaft 60 adjacent the ends thereof are two bevel gears 66, the drawing showing only the gear at the left side of the helicopter, or at the right as viewed in Fig. 8.

The housing 56 is provided with similar lateral extensions 68 and 70. Tubular members 72 and 74 are rotatably mounted in the respective housing extensions 68 and 70 by means of suitable bearings. These tubular members are connected with the lower ends of the respective rotor shafts 18 and 20 and in effect constitute extensions of the said shafts. The term "shaft" will sometimes hereinafter be used to collectively designate the shaft proper and the corresponding tubular member. The tubular member 72 and the bearings therefor and other associated parts are shown in section in Fig. 8. It will be understood that the bearings and associated parts for the tubular member 74 are similar to those for the tubular member 72. Secured to the tubular member 72 is a bevel gear 76 which meshes with the before-mentioned bevel gear 66 on the shaft 60. The shaft 60 is rotated in the direction to rotate the bevel gear 76 and the tubular member 72 in the direction indicated by the arrow, that is in the counter-clockwise direction, it being clear that the tubular member 74 will be rotated in the opposite direction. Inasmuch as the tubular members 72 and 74 are connected with the respective shafts 18 and 20, the said shafts and the rotors connected therewith will be similarly rotated.

*Rotors*

As concerns certain aspects of the invention, the rotors may be widely varied as to construction and manner of operation. The blades of the rotors are independently adjustable to change the pitches thereof, and as presently preferred the pitch changes are effected aerodynamically by servo flaps carried respectively by the several blades. Furthermore, the several blades are preferably connected with the rotor hubs to prevent bodily rotation of the blade root portions about axes extending longitudinally of the blades, the blades being twisted relatively to their said root portions by the said servo flaps to effect the required pitch changes. The following detailed description relates to rotors having blades which are formed, supported and controlled in the manner above generally outlined and as set forth in the aforesaid patent, but it will be understood that the invention is not necessarily so limited.

Figs. 3 to 7 show the rotor which is at the left side of the helicopter, that is the rotor which appears at the right in Fig. 1. As has been stated, the two rotors are similar except that the several parts thereof are positioned and shaped for rotation in opposite directions. The rotor shown is connected and adapted for rotation in the counter-clockwise direction as viewed from above, the other rotor being connected and adapted for rotation in the clockwise direction.

Extending through horizontal apertures in the upper part of the shaft 18 is a horizontal pivot pin 78, having its end portions projecting beyond the shaft. A hub member 80 is provided having a large central aperture through which the upper end of the shaft extends. Bearings, not shown in detail, are provided at 82, 82 on the hub member, these bearings serving to connect the hub member with the pin 78 for pivotal movement about the axis of the pin. The pin 78 and the bearings 82, 82 are so located that the axis of pivotal movement is at an acute angle, preferably about 60°, with respect to the longitudinal axes of the blades 26, 26 with the blades in the positions shown in Fig. 3. The said angle is such that each bearing 82 and the corresponding end of the pin is at the leading side of the longitudinal axis of the corresponding blade.

Two blade supports 84, 84 are provided at the ends of the hub member 80, these blade supports being connected with the hub member 80 for pivotal movement about vertical drag axes at 86, 86. Suitable bearings, not shown in detail, are provided for the pivotal connection between the blade supports and the hub member. The inner end portions of the blades 26, 26 are rigidly connected with the respective blade supports 84, 84, and the blade supports are so formed that the blades are held at positive dihedral angles as shown.

Shoulders 87 on the hub member 80 limit relative pivotal movement of blade supports and blades in the trailing direction during power-on flight, the limit of movement being about 25°. Shoulders 88 on the hub member 80 limit relative pivotal movement of the blade supports and blades in the leading direction during autorotation, the limit of movement being about 10°.

In order that the two blade supports may move pivotally in unison, or substantially so, they are connected with each other by two similar links indicated generally at 89, 89, the links being pivotally connected at 90, 90 and 92, 92 with lateral ears formed on the blade supports 84, 84. Each of the links 89 is variable in its effective length and is preferably constructed as shown in detail in Figs. 6 and 7 so as to serve as a damper. Each link comprises a member 94 which is bifurcated and also comprises a member 96 which extends between the bifurcations of the link member 94. Interposed between the inner faces of the bifurcations of the link member 94 and the outer faces of the link member 96 are sheets of friction material 98, 98. These sheets are suitably connected with one of the members, as for instance the member 96. In order to apply frictional pressure against the friction sheets 98, 98 two plates 100, 100 are provided at the outer sides of the bifurcations of the link member 94. Bolts 102, 102 connect the plates 100, 100, and by adjusting the nuts on the bolts the plates may be drawn toward each other so as to apply adjustable frictional pressure at the friction sheets 98, 98. It will be seen that the links 89, 89 serve to connect the blade supports 84, 84 and the blades 28, 28 for pivotal movement normally in unison about the axes at 86, 86. The frictional connections included in the links enable them to act as dampers and to resist any pivotal or oscillatory movements of one blade support with its blade independently of the other, but the links nevertheless permit such limited independent pivotal or oscillatory movements.

The main body of each blade 26 is shown as being formed of wood which may be laminated in accordance with usual practice, but the invention is not limited to a blade formed of wood nor to a blade of solid construction. When the blade is formed of wood the cross-sectional area at the root portion, that is, at the portion adjacent the blade support is preferably greater than the cross-sectional area at any other portion.

It will be observed that, while the two blades are pivotally movable in unison about the horizontal axis of the pivot pin 78 and are also pivotally movable about the vertical axes at 86, 86, they are nevertheless rigidly held so as to prevent any relative rotative movements of the root portions thereof about axes extending longitudinally of the blades. Each blade is initially positioned as shown in Fig. 5, but each blade, whether formed of wood or otherwise, is capable of substantial twisting about its longitudinal mean axis and with respect to its non-rotatable root portion so as to change its effective pitch. The blade has torsional resiliency which tends to restore it to its initial normal position and shape after twisting.

The outer end portions of the blades 26, 26 carry the before-mentioned auxiliary aerofoil flaps 30, 30 which are angularly movable relatively to the blades about axes substantially parallel with the mean axes of the blades. These flaps 30, 30 may be adjusted angularly about the last said axes by relatively movable flap moving connections extending from the flaps to the fuselage, these connections being hereinafter described in detail. When the blades are rotating, the flaps 30, 30 serve by reason of aerodynamic forces acting thereon to twist the corresponding blades progressively from the non-rotatable root portions thereof to the flaps and to thus change the effective pitches of the blades. The extent of the changes in the effective pitches of the blades is dependent upon the angular positions of the flaps as determined by the before-mentioned flap moving connections. The action of flaps such as 30, 30 is set forth in detail in the aforesaid patent.

The flaps 30, 30 may be located adjacent the leading edges of the blades as shown in the aforesaid patent or they may be located adjacent the trailing edges of the blades as herein shown and as now preferred. The flaps are preferably spaced upwardly from the blades as shown. Each flap 30 may be formed of laminated wood, but the invention is not limited to a flap formed of wood nor to a flap of solid construction. For pivotally connecting each flap 30 with the corresponding blade 26 there is provided a bracket 106 which is secured to the blade and which fits around it. Secured to the flap 30 is a bracket 108 and this bracket is connected with the bracket 106 for pivotal movement about an axis at 110 substantially parallel with the mean axes of the blade.

The flap moving connections of the flaps 30, 30 are shown in their neutral positions in Figs. 3, 4 and 5. The said connections include links or rods 112 and 114 which are located within the hollow shaft 18 and are movable vertically. The rod 112 serves to control the flap 30 at the left as viewed in Fig. 3 and the rod 114 serves to control the other flap, not shown in Fig. 3. The connections between the rods 112 and 114 and the corresponding flaps are similar and it will be sufficient to described in detail the connection between rod 112 and the flap 30 as shown in Figs. 3 and 4.

The rod 112 is connected at its upper end with one arm of a bell crank 116 which is pivoted at 118 on the hub member 80 for movement about a horizontal axis which is perpendicular to the longitudinal axis of the blades when the blades are in the positions shown and which is perpendicular to a vertical plane through the axes 86, 86. The other arm of the bell crank 116 is connected at 119 with one end of a link 120, the connection being such that the link can swing laterally as well as vertically. The opposite end of the link 120 is connected at 121 with a lever 122 which is pivotally connected to the blade support for movement about a horizontal axis at 124 extending transversely of the blade.

A second lever 126 is pivoted to the blade support for movement about a horizontal axis at 128 also extending transversely of the blade. The two levers 122 and 126 are connected by a link 130. A push-pull link or rod 132 extends longitudinally of the blade 26 along the leading edge thereof, the inner end of the link being pivotally connected with the lever 126 at 134. A portion of the rod 132 extends within a recess or groove formed in the leading edge of the blade, the said recess or groove being enclosed by a leading edge member which conforms to the required shape of the blade. The outer end of the rod 132 is pivotally connected at 136 with one arm of a bell crank 138 which is pivotally connected with the bracket 106 for rotation about a vertical axis at 140. A link 142 is pivotally connected at its forward end at 144 with the other arm of the bell crank 138. The rearward end of the link 142 is pivotally connected at 146 with an extension 148 formed integrally with the bracket 108 which carries the flap 30.

Fig. 15 shows the blade 26 and the flap 30 in their initial positions, the axis of rotation being indicated at A. The blade 26 is shown as having an unsymmetrical aerofoil shape with a straight bottom face or chord line. Thus the blade has a positive camber and has an effective positive pitch greater than the pitch angle of the chord line. When the chord line is horizontal or at a zero pitch angle as shown, the effective positive pitch of the blade may be about 6°. When reference is hereinafter made to blade pitch, it is to be understood that effective blade pitch is meant and not the pitch angle of the chord line.

The flap 30 may have an unsymmetrical aerofoil shape with a straight bottom face or chord line, as shown in Figs. 5 and 15. Thus the flap 30 has a positive camber and has an effective positive pitch when the pitch angle of the chord line is zero. Alternatively, a flap 30a may be provided having a symmetrical aerofoil shape, as shown in Fig. 15A. The flap 30a has no camber and has zero effective pitch when a line through the axis of symmetry thereof is at zero pitch angle. Also alternatively, a flap 30b may be provided having an unsymmetrical aerofoil shape with a straight top face or chord line, as shown in Fig. 15B. The flap 30b has a negative camber and has an effective negative pitch when the pitch angle of the chord line is zero.

Aerodynamic action on the flap during rotation serves to apply a downward force or an upward force to the trailing portion of the blade, thus twisting the blade in one direction or the other to increase or decrease the effective positive pitch thereof. The direction of twisting is dependent upon the aerofoil shape and the angular position of the flap. When the flap has a positive camber and is in the position shown in Fig. 15, the flap has a small positive pitch and tends to twist the blade clockwise to decrease the positive pitch thereof. When the flap has no camber and is in the position shown in Fig. 15A, it does not tend to twist the blade. When the flap has a negative camber and is in the position shown in Fig. 15B, the flap has a negative pitch and tends to twist the blade counter-clockwise to increase the positive pitch thereof.

For normal flight, the flap is moved relatively clockwise so that it has a negative effective pitch, as shown in Fig. 16, and aerodynamic action on the flap during rotation serves to apply a downward force at the trailing portion of the blade, thus twisting the blade in the counter-clockwise direction to increase the positive pitch thereof. As the blade is twisted counter-clockwise to increase the positive blade pitch, the flap moves with the blade angularly downward or counter-clockwise so as to decrease the negative flap pitch. Thus a condition of relative equilibrium is established, with the blade pitch determined by the relative angular position of the flap. For normal flight the positive pitch angle of the blade chord line may be about 8°, as shown in Fig. 16, the positive pitch of the blade being substantially greater, as for instance about 14°.

While Figs. 15, 16 and 17 show a flap 30 with a positive camber, a flap 30b with a negative camber has certain advantages and may be preferable. With a negative camber the flap is more effective in the positions of negative pitch in which it is usually located, as exemplified in Fig. 16.

When the flap is moved relatively counter-clockwise to decrease the negative pitch thereof, as shown in Fig. 16, there is a reversed or clockwise twisting of the blade with a resultant decreased positive blade pitch. As the blade is twisted clockwise to decrease the positive blade pitch, the flap moves with the blade angularly upward or clockwise so as to increase the negative flap pitch. Thus a condition of relative equilibrium is again established, with the blade pitch determined by the new relative angular position of the flap.

Referring further to Fig. 16, the relative direction of air movement is rearward and slightly downward with respect to the direction of blade movement as represented by the arrow B. The amount and direction of lift are represented by the arrow C, the direction of lift being perpendicular to the direction of air movement. The amount and direction of blade drag are represented by the arrow D, the direction of drag being perpendicular to the direction of lift. The forces represented by the arrows C and D have a net component indicated by E which acts in opposition to the direction of rotation, this component representing the power input necessary to turn the blade about the main axis at A. It will be understood that the directions and lengths of the arrows in Fig. 16 are intended merely to illustrate the principles of action without necessarily constituting accurate representations. The factors represented by the arrows vary widely with the blade pitch, with the speed of rotation and with other conditions.

From the foregoing description of the flap action it will be apparent that the amount of blade twisting to increase or decrease the blade pitch is dependent upon the relative angular position of the flap as determined by the flap moving connections which include the rod 112. When the rod 112 is moved upward, the bell crank 116 is moved counter-clockwise, the link 120 is moved outward, the levers 122 and 126 are swung outward and the push-pull rod 132 is moved outward. Outward movement of the rod 132 causes rearward movement of the link 142, thus moving the flap 30 upward or clockwise to increase the negative flap pitch and to thus increase the positive blade pitch. When the rod 112 is moved downward, the described movements are reversed and the flap 30 is moved downward or counter-clockwise to decrease the negative flap pitch and to thus decrease the positive blade pitch.

The upper ends of the rods 112 and 114 are connected with the respective bell cranks 116, 116 at points close to and below the pivotal axis 78 of the hub member 80, and a line through the connections of rods 112 and 114 with the bell cranks is parallel to the said pivotal axis 78, as will be apparent from Figs. 3 and 11. Pivotal movement of the hub member about the said axis 78 does not substantially affect the action of the described flap moving connections.

Fig. 3 shows the initial relationship between the blades 26, 26 and the hub member 80. However, when power is applied the air resistance upon the blades and the flaps causes them to lag or drag, the blades swinging relatively rearward about the drag axes at 86, 86, as indicated schematically in Fig. 14. This tendency to drag is offset by centrifugal force and for any given conditions the blades assume relative positions representing a balance between the air resistance and the centrifugal force. The angle of drag varies widely with the amount of air resistance and it may be as great as about 25° as limited by the shoulders 87, but the said angle of drag is ordinarily considerably less, as for instance about 15°. The links 89, 89 tend to maintain the two blades at the same lag angles.

By reason of cyclic pitch changes as hereinafter described, each blade tends to relatively lag when at its maximum cyclic pitch and to relatively advance when at its minimum cyclic pitch. The pivotal connections of the blades to the hub member at 86, 86 permit the blades to oscillate with respect to the hub member and in the plane of rotation. The two blades do not so oscillate in unison as they attain their conditions of maximum cyclic pitch and of minimum cyclic pitch alternately and not simultaneously. The links 89, 89, by reason of the frictional connections therein, permit but nevertheless resist independent oscillatory movements about the axes 86, 86.

The blades not only swing horizontally about the vertical axes 86, 86 but they also oscillate in unison about the horizontal axis at 78. The oscillatory movement about the axis 78 results from various factors one of which is that each blade has an increased lift as it moves relatively forward in the direction of helicopter flight and in opposition to air flow and has a decreased lift as it moves relatively rearward in unison with air flow. As has been pointed out the pivotal axis at 78 is at a leading acute angle with respect to the longitudinal axes of the blades. Inasmuch as the blades normally have positive pitches, the result is that as each forward moving blade swings upward its net pitch is decreased and that as each rearward moving blade swings downward its net pitch is increased. This action tends to minimize or limit the extent of oscillation resulting from the relatively forward and rearward movements of the blades.

*Azimuth mechanisms*

Figs. 8 and 9 show the azimuth mechanism associated with the shaft 18 and with the corresponding rotor. It will be understood that a similar azimuth mechanism is provided in association with the shaft 20 and the corresponding rotor, the two azimuth mechanisms being identical in construction except for reversals of shapes and positions.

The azimuth mechanism comprises a supporting plate 150 which is pivotally mounted at its outer end for movement about a longitudinal axis. As shown, a longitudinal pivot rod 152 extends through a longitudinal aperture in the plate 150, the rod 152 being fixedly supported on the fuselage by means not shown. The supporting plate 150 has a large recess adjacent its inner end with arms 154, 154 at opposite sides of the recess.

A substantially semicircular yoke 156 is positioned between the arms 154, 154 near the outer ends thereof, the said yoke being connected with the said arms for pivotal movement about a longitudinal axis. Centrally connected with the yoke 156 near the bottom thereof is a vertically extending link 158. When the link 158 is moved upward or downward the yoke 156 is similarly moved upward or downward and the plate 150 is swung upward or downward about its pivotal axis at 152.

A gimbal ring 160 is located in the space between the arms 154, 154, being pivotally connected with the said arms for pivotal movement about a preferably longitudinal axis at 162, 162. The last said axis intersects the axis of rotation of the tubular member 72 and of the rotor shaft 18. The gimbal ring 160 is provided with a downward extending arm 164 and a link 166 is pivotally connected at its inner end with the said arm 164. The outer end of the link 166 is pivotally connected with one arm of a bell crank 168, the bell crank being pivotally movable on the pivot rod 152 which supports the plate 150. The other arm of the bell crank 168 is pivotally connected with a vertical link 170. When the link 170 is moved downward the link 166 is moved outward and the gimbal ring 130 is moved about its pivotal axis in the counterclockwise direction. When the link 170 is moved upward the link 166 is moved inward and the gimbal ring is moved in the clockwise direction.

Connected with the gimbal ring 160 is a control element 172 which is preferably an approximately semicircular yoke, the said yoke or control element preferably embracing the said gimbal ring. The ends of the control element 172 are pivotally connected with the ring for movement about an axis at 174, 174 which axis is perpendicular to the axis 162, 162 and intersects the axis of rotation of the tubular member 72 and of the rotor shaft 18. Pivotally connected with the control element 172 is a longitudinal link 176. When the link 176 is moved longitudinally the control element 172 is swung about its axis at 174, 174.

Positioned partly within the gimbal ring 160 is an azimuth member which is preferably a yoke 178. The azimuth member 178 is pivotally connected with the control element 172 for rotation about an azimuth axis at 179 which, when the parts are in the positions shown in Fig. 8, is in alignment with the axis of rotation of the tubular member 72 and the rotor shaft 18. The position of the azimuth axis 179 coincident with the shaft axis will be designated as the "neutral" position thereof. Positioned within the azimuth member 178 is an azimuth bar 180, this bar preferably being pivotally connected at its ends with the azimuth member for rotation about an axis at 181 which intersects the axis of rotation of the tubular member 72 and the rotor shaft 18, the last said axes being perpendicular when the azimuth axis is in its neutral position as shown but being adjustable to other angular positions as will be explained.

Mechanism is provided for rotating the azimuth bar 180 and the azimuth member 178 about the azimuth axis 179 in unison with the rotation of the shaft and tubular member. This mechanism may be varied as to details, but is preferably constructed in the manner to be described.

Positioned within the tubular member 72 are similar discs 182 and 184, these discs being centrally apertured to provide bearings for a vertically movable rod 186. The rod 186 is provided below the disc 184 with a transverse pin 188 which carries rollers 190 at opposite sides of the rod. The rollers 190 are located in vertical slots 192 formed in two oppositely disposed extensions 194 on the lower end of the tubular member 72. The lower end portion of the rod 186 is bifurcated to provide two arms 196, 196 which are at opposite sides of and in engagement with the azimuth bar 180. The arms 196 are pivotally connected with the bar 180 for relative pivotal movement about a transverse axis at 198. The transverse axis at 198 is vertically movable with respect to the shaft but remains otherwise in fixed relationship therewith.

As has been stated the azimuth member 178 is rotatable with respect to the control element 172 about the azimuth axis 179. The rollers 190 by reason of their engagement with the sides of the slots 192 cause the rod 186 to rotate in unison with the tubular member 72. The rod 186 by reason of its described connection with the bar 180 causes the said bar and the azimuth member 178 to rotate relatively to the ring 160 and the control element 172 and in unison with the tubular member and the shaft.

The before-mentioned rods 112 and 114 extend through the shaft 18 and through the tubular member 72 and are revoluble therewith. The said rods extend into longitudinal slots formed in the azimuth bar 180. The rods are connected with the bar 180 for relative pivotal movements about oppositely disposed axes at 200 and 202 which are eccentric with respect to the azimuth axis 179. The discs 182 and 184 are provided with holes through which the rods 112 and 114 extend. The last said holes are considerably larger than the rods.

The azimuth mechanism at the left side of the helicopter, but shown at the right side of Fig. 8, has been described in detail. Both azimuth mechanisms and various related parts are shown schematically in Fig. 10. Connected with the right azimuth mechanism, shown at the left in Fig. 10, are two rods 206 and 208 corresponding respectively to the rods 112 and 114 and extending through the right rotor shaft 20. The right azimuth mechanism comprises a plate 209 corresponding to the plate 150, a yoke 210 corresponding to the yoke 156, a gimbal ring 211 corresponding to the ring 160, a control element 212 corresponding to the control element 172, an azimuth member 214 corresponding to the azimuth member 178, and an azimuth bar 216 corresponding to the azimuth bar 180. Control links 218, 220 and 222 are provided corresponding respectively to the links 158, 170 and 176.

The rotor at the right of the helicopter is not shown in detail, but is shown generally in Figs. 1 and 14. The said rotor is exactly the same as that shown in Figs. 3 to 7, except that the parts are reversed in shape and position for clockwise rotation instead of counter-clockwise rotation. The rods 206 and 208 move the flaps 32, 32 in the same manner as already described in connection with the flaps 30, 30.

Fig. 11 is a fragmentary schematic view showing the relationship between the rotor and the corresponding azimuth bar and also showing the relative positions of the connecting rods. Each of the azimuth bars 180 and 216 is at a leading angle with respect to the longitudinal axes of the corresponding rotor blades when the blades are in their initial positions as shown in Fig. 3. Preferably the leading angle is approximately 60°, the azimuth bar being parallel with the pivotal axis 78 of the corresponding hub member, as shown in Figs. 10 and 11. Actually the leading angle of the azimuth bar with respect to the blades during rotation is more than 60°, this being due to the relatively rearward turning or lag of the blades about the axes 86, 86. As stated, the extent of such relative rearward turning or lag may be as much as 25° but it is ordinarily considerably less. The net leading angle may therefore be as much as 85° but it is ordinarily somewhat less, as for instance about 75°. The rods 112 and 114 cross each other within the corresponding rotor shaft. This will be apparent from Fig. 11 which shows the lower end of the rod 112 toward the front and the upper end thereof toward the rear. Similarly, the lower end of the rod 114 is toward the rear and the upper end thereof is toward the front.

The drawings show the azimuth mechanism and the flap control connections in neutral positions, the blades and flaps being in the relative positions shown in Figs. 5 and 15. Referring particularly to the parts at the left of the helicopter, it will be observed that upward movement of the link 158 causes upward movement of the entire azimuth mechanism and of the rods 112 and 114. As has been explained, upward movement of each rod causes the twisting of the corresponding blade during rotation to increase the positive pitch thereof. Similarly, downward movement of each rod causes the twisting of the corresponding blade in the opposite direction to decrease the positive pitch thereof. When the rods 112 and 114 are moved upward or downward in unison by means of the link 158 the effective collective pitches of both blades are increased or decreased in unison and to the same extents.

As has been explained, each azimuth bar 180 or 216 rotates about its azimuth axis in unison with the corresponding rotor shaft and rotor. The azimuth axis may be in its neutral position which is coincident with the axis of rotation of the shaft and rotor as shown in the drawings, and when the azimuth axis is in neutral position there are no cyclic variations of blade pitch. Referring particularly to the mechanism at the left of the helicopter, it will be observed that rearward movement of the link 176 swings the control element 172 in the counter-clockwise direction, as viewed in Fig. 10, the azimuth axis being inclined toward the front. Similarly, forward movement of the link 176 swings the control element 172 in the clockwise direction, the azimuth axis being inclined toward the rear. Downward movement of the link 170 swings the gimbal ring 160 in the counter-clockwise direction, the azimuth axis being inclined transversely outward or toward the right. Similarly, upward movement of the link 170 swings the gimbal ring in the clockwise direction, the azimuth axis being inclined transversely inward or toward the left. Combined movements of the links 176 and 170 serve to incline the azimuth axis in any direction and to any extent within predetermined limits.

With the parts initially in the positions shown in Figs. 8, 9, 10, 11 and 14 and still referring to the parts at the left of the helicopter, it may be assumed that the azimuth axis has been inclined directly forward, it being borne in mind that the azimuth bar is at a substantial leading angle with respect to the blades. The rod 112 is being moved relatively downward and the rod 114 is being moved relatively upward. The link 120 and the push-pull rod 132 for the forward moving blade 26 as shown in Fig. 14 are moved inward to decrease the pitch of the said blade. Similarly, the link 120 and the corresponding push-pull rod for the rearward moving blade 26 as shown in Fig. 14 are moved outward to increase the pitch of the said blade. Thus the pitch of the forward moving blade 26 is decreased, and the pitch of the rearward blade 26 is increased.

As has been stated the azimuth bar 180 leads the blades by a substantial angle which may be about 75°, the azimuth bar being parallel with the axis 78. As the pitch of the forward moving blade is decreased the said blade tends to swing downward about the axis at 78, and as the pitch of the rearward moving blade is increased the said blade tends to swing upward about the axis at 78. Thus the two blades tend to swing in unison. There is a lag in the said swinging movements of the blades, the result being that the forward moving blade reaches its lowermost position when at the front and that the rearward moving blade reaches its uppermost position when at the rear. The angle of lag of the blades in reaching their said lowermost and uppermost positions is equal or approximately equal to the leading angle of the axis 78, the said positions therefore being reached when the azimuth lever and the axis 78 have moved to transverse positions.

As rotation continues the pitches of the blades are cyclically changed, the blades repeatedly reaching their lowermost positions when at the front and repeatedly reaching their uppermost positions when at the rear. The extent of the cyclic pitch changes and of the resulting swinging movement can be changed by changing the amount of inclination of the azimuth axis. The net effect of the cyclic pitch changes and of the resultant blade swinging is equivalent to a tilting of the axis of rotor rotation in the direction of the azimuth axis inclination. The lifting force of the rotor is therefore inclined in the direction of inclination of the azimuth axis, and the rotor acts to move the helicopter in the said direction, that is, forward when the azimuth axis is inclined forward.

As stated the azimuth axis can be inclined in any direction. Thus the lifting force of the rotor can be inclined in any direction in accordance with the direction of azimuth axis inclination, and the rotor acts to move the helicopter in the corresponding direction.

*Pilot operable control mechanism for uniform collective and cyclic pitch changes*

For the control of basic collective pitch there is provided a mechanism including a collective pitch control stick 33 heretofore mentioned in connection with Fig. 1. The stick 33 is conveniently located to be grasped by the left hand of the pilot. The stick 33 constitutes a pilot operable device for controlling changes in basic collective pitch. The said stick is connected to a shaft 244 mounted for movement about a fixed transverse axis. Depending from the shaft 244 are arms 246 and 248. Longitudinal links 250 and 252 are connected at their forward ends with the respective arms 246 and 248, the connections being indirect as hereinafter explained in detail. The links 250 and 252 are connected respectively at their rear ends with bell cranks 254 and 256 which are mounted for movement about fixed transverse axes. The beforementioned links 158 and 218 are connected respectively with the said bell cranks 254 and 256. It will be seen that when the stick 33 is moved rearward the links 250 and 252 are moved forward and the links 158 and 218 are moved upward. As the links 158 and 218 are moved upward the azimuth mechanisms and the rods 112, 114 and 206, 208 are moved upward. Thus the effective collective pitches of the blades of both rotors are increased simultaneously and to the same extents. Similarly, when the stick 33 is moved forward the collective pitches of the blades of both rotors are decreased simultaneously and to the same extents. Thus the stick 33 serves as the primary means for increasing or decreasing the basic collective pitches of both rotors to control the vertical lift exerted by the rotors.

The stick 33 is spring-biased to its lower forward position, corresponding to the normal minimum collective pitch of the blades as shown in Fig. 15. Upward and rearward movement of the stick for increased basic collective pitch is in opposition to the spring biasing means. The last said means will be hereinafter described in detail.

For the primary control of cyclic pitch there is provided a mechanism including a cyclic pitch control stick 34 heretofore mentioned in connection with Fig. 1. The stick is conveniently located to be grasped by the right hand of the pilot. The stick 34 constitutes a pilot operable device for controlling changes in the cyclic pitches of the blades of both rotors. The pilot operable device or stick 34 is separate from and movable independently of the pilot operable device or stick 33. The stick 34 is movable in any direction generally parallel to a fixed plane which with the construction shown is a horizontal plane. Preferably and as shown, the stick is pivotally movable. The immediately following description relates to the parts associated with the stick for enabling it to move in any direction as stated and for enabling it to control the changes in cyclic pitches.

A longitudinal tube 260 is provided which is mounted for oscillation about its own axis. Secured to the tube at the front thereof is a bracket 262, and the stick 34 is pivoted to the bracket for movement about a transverse axis at 264. Extending through the tube 260 is a longitudinally movable member or rod 266, the front end of the rod being pivotally connected with the lower end of the stick 34 below the pivotal axis at 264. The member or rod 266 constitutes a pilot controlled member for controlling changes in cyclic pitch.

By means of mechanism to be hereinafter fully explained, the rear end of the rod 266 is connected with bell cranks 268 and 270 which are mounted for movement about fixed transverse axes. Connected with the respective bell cranks 268 and 270 are substantially vertical links 272 and 274. The upper ends of the links 272 and 274 are connected respectively with bell cranks 276 and 278. The said bell cranks 276 and 278 are connected respectively with the forward ends of the before-mentioned links 176 and 222.

When the stick 34 is moved forward, the rod 266 is moved rearward and the links 272 and 274 are moved upward. As the links 272 and 274 move upward the links 176 and 222 move rearward, thus inclining the azimuth axes toward the front. Similarly when the stick 34 is moved rearward the azimuth axes are inclined toward the rear. The azimuth axes are moved in the direction of stick movement.

Depending from the tube 260 is an arm 280. As more clearly shown in Fig. 12, two transversely extending links 282 and 284 are connected at their inner ends with the arm 280. The outer ends of the links 282 and 284 are connected respectively with bell cranks 286 and 288 which are mounted for movement about fixed vertical axes. Links 290 and 291 are connected respectively at their forward ends to the bell cranks 286 and 288. The said links 290 and 291 are connected respectively at their rear ends to bell cranks 292 and 293 which are mounted for movement about fixed transverse axes. The beforementioned links 170 and 220 are connected respectively at their lower ends with the bell cranks 292 and 293.

When the stick 34 is moved toward the right of the helicopter, or toward the left as viewed in Fig. 10, the tube 260 and the arm 280 are turned, the links 282 and 284 being moved toward the left. The link 290 is moved forward and the link 291 is moved rearward. As the link 290 moves forward, the link 170 is moved downward and the left azimuth axis is inclined inward or toward the right. As the link 291 moves rearward, the link 220 is moved upward and the right azimuth axis is inclined outward or toward the right. Similarly, when the stick 34 is moved toward the left, the azimuth axes are inclined toward the left. The azimuth axes are moved in the direction of stick movement.

By combining forward or rearward movements of the stick 34 with lateral movements thereof the two azimuth axes can be moved in unison and to the same extents so as to be inclined in any desired direction corresponding to the inclination of the stick. In this way the phases of the cyclic pitch changes for both rotors are uniformly shifted to any desired positions with respect to the helicopter.

As has been pointed out each rotor tends to move the helicopter in the direction of azimuth axis inclination. It will therefore be apparent that the helicopter can be caused to move in any direction, forwardly or rearwardly or laterally, by correspondingly moving the stick 34. The changes in the phase positions of the cyclic pitches serve to control horizontal flight in any direction. For vertical movement or for hovering, the stick 34 is maintained in a neutral position to eliminate cyclic pitch variations.

Means is preferably provided for automatically moving the stick 34 to its neutral position. Oppositely acting springs 294 and 295 are provided which tend to move the rod 266 to a neutral position, the springs therefore serving to also move the stick 34 to a neutral position as concerns forward and rearward movements. Springs 296 and 297 act on the links 290 and 291 to press them in one direction, which may be the forward direction. Inasmuch as the links 290 and 291 move in opposite directions, the springs tend to move the links to neutral positions. The springs also serve to move the stick 34 to a neutral position as concerns lateral movements. Thus the springs 294, 295 and 296, 297 cooperate to automatically move the stick 34 to its neutral position from any position to which it may have been moved.

*Automatic collective pitch changes*

As has been stated the collective pitch of each rotor can be increased or decreased by the pilot operated control mechanism, the corresponding link 158 or 218 being moved upward or downward. It has also been stated that during power-on flight the blades of each rotor relatively lag or drag, swinging relatively rearward about the axes 86, 86. Similarly, during auto-rotation, as hereinafter explained in detail, the blades of each rotor relatively lead, swinging relatively forward about the axes 86, 86. The relative movements of the blades about the axes 86, 86 are utilized to automatically vary the collective pitches. This will be more readily apparent from the diagrammatic Fig. 17A.

In Fig. 17A the axis of rotor rotation is indicated at A, the rotor moving counter-clockwise as in Fig. 3. The blade is represented by the line 26, the blade being pivoted for horizontal movement about the axis 86 and having a drag angle X for an assumed condition of power-on flight. The angle X is exaggerated for clarity of illustration. The link 120 is included in the flap moving connections which have been described. For an assumed relatively fixed position of the corresponding bell crank 116, the position of the link connection at 119 is relatively fixed, and the link connection at 121 is held in a position which is relatively fixed so long as the angle X remains unchanged.

If the motor speed is increased, the hub member speed is correspondingly increased and the blade 26 assumes a greater drag angle Y, then rotating in unison with the hub member. A substantially uniform rotor speed is ordinarily desirable and the tendency of the rotor to rotate at a greater speed must be offset by an increase in the collective blade pitch. With the construction shown and described, the required increased collective pitch is provided in part by the movement of the collective pitch stick 33 by the pilot. However, a part of the required increased collective pitch is provided automatically.

It is assumed that the blade moves from the initial drag position 26 represented by the angle X to the drag position 26′ represented by the angle Y. The point 121 is on the blade (or the blade support) and as the blade moves about the axis 86 the point 121 tends to move with the blade along the arc F concentric with 86. However, the point 121 is controlled by the link 120 and is therefore forced to move to the position 121′ along the arc G which is concentric with 119. Therefore, the point 121, in following the arc G rather than the arc F, is forced relatively outward along the blade, thus moving the flap to increase the blade pitch. The increase in pitch corresponds to the spacing, for any given position, between the arcs G and F.

Conversely, if the motor speed is later reduced the blade will move from the position 26′ represented by the angle Y to the position 26 represented by the angle X. The described action is reversed and the blade pitch is decreased.

From the foregoing description it will be apparent that, during power-on flight, the collective pitch of the blades is automatically increased with increased rotor speed and is automatically decreased with decreased rotor speed.

During autorotation the blade 26 moves relatively forward so that it has a small leading angle such as Z, the blade having the position represented at 26″. The point 121 moves to a position 121″ on the arc G. Inasmuch as the angle Z is small, the point 121″ on the arc G is very close to the arc F. The arcs G and F are actually slightly separated at 121″, although such separation does not clearly show in the drawing. The arcs coincide only at the line through the points A, 119 and 86. By reason of the very small distance between the arcs G and F at 121″ the pitch of the blade is decreased from the pitch established at the drag position represented either by the angle X or by the angle Y wherein the arcs G and F are much more widely separated. Thus there is an automatic decrease in collective pitch when there is a change from the power-on regime to the autorotative regime.

*Pilot operable directional control mechanism*

For providing directional flight control two foot pedals 35 and 36 are provided, these having been heretofore mentioned in connection with Fig. 1. The pedals 35 and 36 collectively constitute a pilot operable direction control device for controlling directional changes. The said pedals are positioned for engagement respectively by the left foot and the right foot of the pilot and they are mounted for movement in opposite directions about fixed transverse axes. The pilot operable direction control device or pedals 35 and 36 which control changes in the direction of flight are separate from and movable independently of the device or stick 33 which controls vertical movement and are separate from and movable independently of the device or stick 34 which controls horizontal flight.

Longitudinal links 302 and 304 are pivotally connected at their forward ends with the respective pedals below the pivotal axes thereof. The rear ends of the links 302 and 304 are pivotally connected with a cross bar 306 which is mounted for pivotal movement about a fixed vertical axis near the center of the bar at 308. By means of mechanism which includes a link 310 and which will be hereinafter described in detail, the cross bar 306 is connected with a differential collective pitch cross bar 312 which is mounted for movement about a fixed vertical axis near the center of the bar at 314. Normally the cross bars 306 and 312 move in unison and in the same directions.

The before-mentioned arms 246 and 248 are rigidly connected and they collectively constitute a pilot controlled member movable in opposite directions to simultaneously change the collective pitches of the blades of both rotors. The before-mentioned links 250 and 252 are not connected directly with the arms 246 and 248 but are connected indirectly therewith by means of a differential collective pitch device. The differential collective pitch device is movable in unison with the pilot controlled member, that is, with the arms 246 and 248 and is also movable relatively thereto. The differential collective pitch device includes levers 320 and 322 which are pivoted to the respective arms 246 and 248.

Links 316 and 318 are pivotally connected at their forward ends with the cross bar 312 near the respective ends thereof. Each of the arms 246 and 248 is provided with two transversely spaced parts, and the said levers 320 and 322 are positioned between the said parts of the respective arms. The lower end of each lever is pivoted at 324 to the lower end of the corresponding arm as more clearly shown in Fig. 13. The rear ends of the links 316 and 318 are pivoted to the upper ends of the respective levers 320 and 322 as indicated at 326 in Fig. 13. The forward ends of the before-mentioned links 250 and 252 are pivoted to the intermediate portions of the respective levers 320 and 322 as indicated at 328 in Fig. 13.

With the links 316 and 318 in fixed positions, the arms 246 and 248 move the links 250 and 252 as already described. Referring particularly to Fig. 13 it will be seen that the pivotal axis at 324 moves with the arm 246, the lever 320 pivoting about the axis at 326 which is substantially fixed. As the lever 320 moves about the axis at 326, the link 250 is correspondingly moved. It will be seen that the link 250 may be moved by the arm 246 with the link 316 stationary, or may be moved by the link 316 with the arm 246 stationary.

Under normal flight conditions and with the helicopter moving in the forward direction, forward displacement of the left pedal 35 of the direction control device causes the cross bars 306 and 312 to turn in the counterclockwise direction. The link 318 is moved forward and the link 316 is moved rearward. As the link 318 moves forward it causes the link 252 to move forward independently of the arm 248 which may be assumed to be in a fixed position. As the link 252 moves forward, it causes the link 218 to move upward, thus increasing the collective pitch of the blades of the right rotor. Similarly, as the link 316 moves rearward it causes the link 250 to move rearward. As the link 250 moves rearward it causes the link 158 to move downward, thus decreasing the collective pitch of the blades of the left rotor. It will be seen that a differential collective pitch control is provided, it being possible to relatively increase the collective pitch of either rotor. Thus the collective pitches of the two rotors may be differentially changed in either of two opposite senses.

As has already been pointed out, the driving reactions of the two oppositely rotating rotors normally balance each other and there is no tendency for the reactive forces to turn the helicopter. However, when the collective pitch of the right rotor is relatively increased, the reactive forces are no longer balanced. The right rotor is rotating clockwise, as shown in Fig. 14, and by reason of its greater pitch requires more power and has a reactive force which is greater than that of the left rotor which is rotating counter-clockwise, There is therefore a net reactive force which turns the helicopter in the counter-clockwise direction or toward the left.

When there is a forward displacement of the right foot pedal 36 of the direction control device, the collective pitch in the left rotor is increased and the collective pitch in the right rotor is decreased. The conditions before-described are reversed and the helicopter turns toward the right.

The described directional control by changing the collective pitches of the two rotors is preferably supplemented by differentially varying the cyclic pitches of the two rotors. A differential cyclic pitch cross bar 330 is provided which is mounted for movement about a fixed vertical axis near the center of the bar at 332. The cross bar 330 is connected with the cross bar 306 by a link 334, the two cross bars moving in unison but in opposite directions. A longitudinal link 336 is provided, this being connected with the cross bar 330 at the right side of the pivotal axis at 332. The rear end of the link 336 is connected with a bell crank 338 which is mounted for movement about a fixed vertical axis. A transverse link is provided having its outer end connected with the bell crank 338.

The rod 266 constitutes a pilot controlled member movable in opposite directions to simultaneously change the cyclic pitches of the blades of both rotors. The before-mentioned bell cranks 268 and 270 are not connected directly with the rod 266 but are connected indirectly therewith by means of a differential cyclic pitch device. The differential cyclic pitch device is movable in unison with the rod or member 266 and is also movable relatively thereto. As illustrated the differential cyclic pitch device includes a cross bar 342 which is pivoted to the rod 266 for movement about a vertical axis at 344 near the center of the bar. Two longitudinal links 346 and 348 connect the ends of the cross bar 342 with the respective bell cranks 268 and 270. Rigidly connected with the cross bar 342 is a bifurcated arm 350 which extends in the forward direction. The inner end of the link 340 is pivotally connected at 352 with the forward end of the arm 350. Movement of the cross bar 342 serves to differentially change the cyclic pitches of the two rotors in either of two opposite senses, but this does not interfere with the changes in the cyclic pitches of both rotors by bodily movement of the cross bar 342 with the rod 266.

With the bell crank 338 and the link 340 in the positions shown the cross bar 342 is perpendicular to the rod 266 and the collective pitches of the two rotors are varied in unison and to the same extents as already described. When the cross bar 342 is pivotally moved relatively to the member or bar 266, the inclinations of the two azimuth axes are changed oppositely and to the same extents.

For example, when the left foot pedal 35 is displaced forwardly for a left turn as already described, the cross bar 306 is moved in the counter-clockwise direction and the cross bar 330 is moved in the clockwise direction. The link 336 is moved rearward and the link 340 is moved outward. The cross bar 342 is turned in the clockwise direction, the link 346 moving forward and the link 348 moving rearward. As the link 348 moves rearward, it moves the link 274 upward and the link 222 rearward. Thus the right azimuth axis is inclined forward to an increased extent and the lift forces on the right rotor are inclined forward to an increased extent. Similarly, as the link 346 moves forward, it moves the link 272 downward and the link 176 forward. Thus the left azimuth axis is inclined rearward to a decreased extent and the lift forces on the right rotor are inclined forward to a decreased extent. By reason of the described inclinations of the azimuth axes and the resulting inclinations of the lift forces, the differential cyclic pitch tends to turn the helicopter toward the left.

When the right foot pedal 36 is displaced forward for a right turn, the conditions last above-described are reversed and the differential cyclic pitch tends to turn the helicopter toward the right.

From the foregoing description it will be apparent that the pedals 35 and 36 constituting the direction control device serve to collectively change the pitches of the two rotors differentially and in either of two opposite senses and also serve to cyclically change the pitches of the two rotors differentially and in either of two corresponding opposite senses. The said differential cyclic and collective pitch changes cooperate to control the direction of flight.

The rudder 38 is preferably movable about an axis at 39 as already stated. When the rudder is so movable, it is connected by the before-mentioned cables 40 and 41 with the cross bar 330. When the left foot pedal 35 is pressed for a left turn, the cable 40 is moved forward to turn the rudder 38 toward the left. When the right foot pedal 36 is pressed for a right turn, the cable 40 is moved forward to turn the rudder 38 toward the right.

It will be observed that with the construction as shown and described, directional control is obtained cooperatively by three simultaneously acting mechanisms which are all under the control of the foot pedals 35 and 36. Directional control is effected by differentially varying the collective pitch, by differentially varying the cyclic pitch and by moving the rudder.

*Autorotative descent in general*

The description of the operation of the various mechanisms as thus far given relates primarily to normal flight conditions with power applied to the rotors. Very different conditions are encountered during autorotative descent. In autorotation aerodynamic forces act on the rotors to maintain rotation in the same directions as during normal power-on flight, the uni-directional clutch 58 permitting the rotors to rotate independently of the motors.

In the power-on regime the shafts drive the rotors, and in the autorotative regime the rotors drive the shafts. It has been pointed out that, during power operation, the blades lag at a trailing angle with respect to the hub member 80, which angle is ordinarily 15° or less and by reason of the shoulders 87 cannot be greater than about 25°. During autorotation the blades are at a small leading angle which by reason of the shoulders 88 cannot be greater than 10°.

For autorotative descent, the effective collective pitches of the blades are decreased to provide the required autorotative equilibrium. With the particular mechanism shown and described, the collective pitch stick 33 is moved forward and downward beyond the position shown in Fig. 10, so that the flaps are moved counter-clockwise to positive pitch positions, as shown in Fig. 17, the blades being twisted clockwise. The chord line of each blade is at a negative pitch angle, but the blade has a small effective positive pitch. Inasmuch as the helicopter is descending, the relative direction of air movement is rearward and slightly upward with respect to the direction of blade movement as represented by the arrow B'. The amount and direction of lift are represented by the arrow C', the direction of lift being perpendicular to the relative direction of air movement. The amount and direction of blade drag are represented by the arrow D', the direction of drag being perpendicular to the direction of lift. The forces represented by the arrows C' and D' have a net component represented by E'. If a uniform speed of rotation be assumed and if there were no frictional or other similar losses, the component E' would be vertical. The rotors are already in rotation and no force is required to maintain rotation other than that necessary to overcome the rotative resistance of the rotors themselves, this force being represented by D'. However, there is some friction in the bearings and in the gearing and there may be certain auxiliary devices (not shown) which must be driven. The component E' is therefore shown at a small angle to represent the stated power losses.

In the power-on regime of flight, a decrease in effective blade pitch (within the power-on pitch limits) causes an increase in rotor speed, it being assumed that the power input remains constant. However, in the autorotative regime of flight, a decrease in effective blade pitch (within the autorotative pitch limits) causes a decrease in rotor speed and an increase in effective blade pitch causes an increase in speed. It will be apparent that the action is reversed during autorotative flight.

It will be understood that normally and preferably the helicopter is moving forward during autorotative descent, it therefore being necessary to provide directional control for the forward movement, this being effected by means of the pedals 35 and 36 constituting the direction control device. For directional control, the rudder, if provided, operates as already described, and the differential cyclic pitch control also operates as already described. However, by reason of the above-mentioned reversal of action during autorotation, the differential collective pitch control cannot act as previously described.

The differential collective pitch control normally serves to relatively increase the positive collective pitch of the right rotor for a left turn and to relatively increase the positive collective pitch of the left rotor for a right turn. However, for a left turn during autorotative descent the action must be reversed, it being necessary to relatively decrease the positive collective pitch of the right rotor, and to relatively increase the positive collective pitch of the left rotor, the action being opposite for a right turn. Without this reversed action, as will be hereinafter more fully explained, the differential collective pitch control would tend to turn the helicopter in the direction opposite to that desired. The differential cyclic pitch and the rudder would tend to turn the helicopter in the desired direction and the differential collective pitch would tend to turn the helicopter in the opposite direction. Under these conditions the pilot would have no definite directional control, as the oppositely acting factors would more or less offset each other. Under some conditions the differential cyclic pitch and the rudder would prevail, and under other conditions the differential collective pitch would prevail. In order to avoid the uncertainties and dangers incident to the above-described conditions, a means is provided for reversing the motion transmitting effect of the differential collective pitch control mechanism and for thus reversing the sense of the differential changes in the collective pitches of the blades.

*Reversing mechanism for differential collective pitch*

As concerns the broader aspects of the invention, any suitable motion reversing means or mechanism may be provided for reversing the motion transmitting effect of the differential collective pitch control mechanism. The presently preferred mechanism is indicated generally at 358 in Fig. 10 and is shown in detail in Figs. 18 to 22.

The reversing mechanism is located between and carried by two stationary plates 360 and 362 as shown in Fig. 10. The upper plate 360 is omitted in Fig. 18, which shows the parts in position for normal flight without any reversal of motion.

A movable support 364 is provided, this preferably being a lever which is connected with the plates for movement about a fixed axis at 365. The support or lever has a rearward position for normal flight and a forward position for autorotative descent, the rearward position being shown in Fig. 18. A strut 366 is provided which is pivoted at 368 to the support or lever 364 and which is pivotally connected at 370 with the rear end of the before-mentioned link 310. A lever 372 is provided, preferably of bell crank form, which is connected with the plates for movement about a fixed axis at 374. The transversely extending arm of the bell crank 372 is connected by a link 376 with the before-mentioned cross arm 312. The link 376 is preferably in approximate alignment with the link 310. An intermediate link 378 is provided, one end of which is pivotally connected at 370 with the link 310 and with the strut 366. The opposite end of the intermediate link 378 is pivotally connected at 380 with the forwardly extending arm of the bell crank 372.

A bell crank 382 is provided which is connected with the plates for movement about a fixed axis at 384. A link 386 has its forward end pivotally connected at 388 with the lever 364 and has its rearward end pivotally connected at 390 with one arm of the bell crank 382. A lever 392 is connected with the plates for movement about a fixed axis at 394. A link 396 is pivotally connected at 398 with the other arm of the bell crank 382 and is pivotally connected at 400 with the lever 392.

The lever 392 is moved to shift the reversing mechanism so as to provide normal motion or reversed motion as required. The lever 392 may be variously actuated, and in its broader aspects the invention is not limited to any particular actuating means. The present preference, however, is to provide mechanism for automatically shifting the reversing mechanism whenever the collective pitch stick 33 is moved to or from its position corresponding to autorotation of the rotors.

Depending from the shaft 244 is a bifurcated arm 402, a block 404 being pivotally mounted between the bifurcations of the arm. A link 406 has its forward end pivotally connected at 408 with the lever 392. The rear end portion of the link 406 extends through an aperture in the block 404, relative forward movement of the link being limited by a nut 410. A coil compression spring 412 surrounds the link 406 and abuts at its rear end against the block 404. The forward end of the spring abuts against a shoulder on the link.

When the collective pitch stick 33 is moved upward and rearward from the position shown in Fig. 10, the arm 402 and the block 404 move forward in opposition to the spring 412. The link 406 and the forward end of the spring 412 cannot move forward beyond the positions shown in Fig. 18. Thus the spring 412 constitutes the before-mentioned means for biasing the stick 33 toward its position corresponding to the minimum collective pitch of the blades for normal flight.

When the collective pitch stick 33 is in the position shown in Fig. 10 or is at a relative rearward and upward position, the reversing mechanism parts are in the positions shown in Fig. 20. When the collective pitch stick 33 is moved downward and forward beyond the position shown in Fig. 10, the reversing mechanism parts are in the positions shown in Fig. 22. As the stick is moved downward and forward, the link 406 is moved rearward and the lever 392 is moved counter-clockwise. The link 396 is moved rearward and the bell crank 382 is moved clockwise. As the bell crank 382 moves clockwise the link 386 is moved forward, thus moving the lever 364 from its rearward position to its forward position. It will be observed that in the positions shown in Fig. 20 the pivotal axis 368 is at the rear of the pivotal axis 380. In the positions shown in Fig. 22 the pivotal axis 368 is at the front of the pivotal axis 380.

The stick 33 is moved downward and forward as last above-described only when the helicopter is descending under conditions of autorotation. The flaps and the blades are approximately in the relative positions shown in Fig. 17 and the blades are being maintained in their normal directions of rotation by aerodynamic forces as already explained. Under these conditions the reversing mechanism serves to reverse the normal action of the differential collective pitch mechanism.

With the parts of the reversing mechanism in the positions for normal flight as shown in Fig. 20, the pivotal axis at 368 is at the rear of the pivotal axis at 380. It may be assumed that the left foot pedal 35 has been moved forward for a left turn. The cross bar 306 has been moved counter-clockwise and the link 310 has been moved rearward. The lever 364 is held in its rearward position, and the link 310 causes the strut 366 to move clockwise about the axis 368. Inasmuch as the pivotal axis 368 is at the rear of the pivotal axis 380, the link 378 moves relatively upward and causes clockwise movement of the bell crank 372. As the bell crank moves clockwise the link 376 moves rearward, that is, in the same direction as the link 310. This is the correct direction for normal operation of the differential collective pitch mechanism as already described. The described motions are opposite when the right foot pedal 36 is moved forward for a right turn.

With the parts of the reversing mechanism in positions for autorotative descent as shown in Fig. 22, the lever 364 has been moved to its forward position and the pivotal axis 368 is at the front of the pivotal axis 380. It may be assumed as before that the left foot pedal 35 has been pressed for a left turn. The cross bar 306 has been moved counter-clockwise and the link 310 has been moved rearward. The lever 364 is held in its forward position, and the link 310 causes the strut 366 to move clockwise about the axis 368. Inasmuch as the pivotal axis 368 is at the front of the pivotal axis 380, the link 378 moves relatively downward and causes counter-clockwise movement of the bell crank 372. As the bell crank moves counter-clockwise the link 376 moves forward, that is, in the direction opposite to the direction of movement of the link 310. The described motions are opposite when the right foot pedal 36 is pressed for a right turn.

*General explanation of directional control by differential collective pitch mechanism*

The action of the differential collective pitch mechanism for controlling the direction of flight during various conditions will be better understood from a consideration of the chart appearing in Fig. 23.

The chart includes curves K, L, M and N representing the relationship between torque and the angles or collective pitches of the rotor blades. Positive torque is that delivered through the shafts to the rotors, and negative torque is that delivered by the rotors and tending to rotate the shafts. Each curve represents a selected constant condition of flight as concerns vertical movement, it being assumed in each instance that speed of rotor rotation is constant. The curves merely represent performance characteristics for the stated conditions and they do not represent variations in blade pitches and in torque occurring during any given flight. Curve K represents climb at 400 feet per minute; curve L represents level flight or hovering; curve M represents descent at 400 feet per minute; and curve N represents descent at 1600 feet per minute. Other rates of climb or descent would be represented by other curves not shown. The shapes and positions of the several curves are merely indicative and do not necessarily show actual values.

For any given flight the weight of the helicopter and its load may be assumed to be constant, and the upward thrust of the rotors is therefore constant. It is accordingly possible to designate a point on each curve at which the blade pitch and the torque are at the proper values to exert the said constant thrust under the flight conditions represented by the curve. For curve K the said point is at O, for curve L the said point is at P, for curve M the said point is at Q, and for curve N the said point is at R. A constant thrust curve S is drawn through the said points O, P, Q and R.

At the point O on the curve K representing climb at 400 feet per minute, the blade pitch is between 14° and 15° and there is a very considerable positive torque. The curve K is sharply inclined at the point O and it will be evident that a small increase or decrease in blade pitch involves a very substantial increase or decrease in torque.

At the point P on the curve L representing level flight, the blade pitch is between 11° and 12° and there is substantially less positive torque than at the point O. The curve L is less sharply inclined at the point P and a small increase or decrease in blade pitch involves an increase or decrease in torque substantially less than that at the point O.

At the point Q on the curve M representing descent at 400 feet per minute, the blade pitch is about 6° and there is substantially less positive torque than at the point P. The curve M is substantially level at the point Q and a small increase or decrease in blade pitch involves little or no torque differential. The leveling of the curve M at the point Q is due to the fact that, at the stated rate of descent, aerodynamic action on the blades tends to rotate the rotors, the positive torque applied through the shafts being correspondingly reduced. Thus there is a condition of partial power descent.

At the point R on the curve N representing descent at 1600 feet per minute, the blade pitch is a little less than 2° and there is no torque, either positive or negative, inasmuch as the blades are in autorotative equilibrium as explained in connection with Fig. 17. It has already been pointed out that, during the autorotative regime of flight, an increase in blade pitch tends to cause an increase in rotor speed and that a decrease in blade pitch tends to cause a decrease in rotor speed. In other words, with an increase in blade pitch the autorotative equilibrium would be disturbed and the rotors would tend to rotate at a higher speed. Similarly with a decrease in blade pitch the autorotative equilibrium would be disturbed and the rotors would tend to rotate at a lower speed. Thus a small increase in blade pitch produces a negative torque and a small decrease in blade pitch produces a positive torque, the result being that the curve N at the point R has an inclination opposite to that of the curves K and L at the points O and P.

Assuming forward flight and assuming climb of 400 feet per minute, both rotors are at the collective pitch represented by the point O on the curve K. Taking a left turn as an example, it has already been stated that the collective pitch of the right rotor is increased and the collective pitch of the left rotor is decreased. The pitch of the right rotor may be increased by 1° to the point O' and the pitch of the left rotor may be decreased by 1° to the point O''. Due to the inclination of the curve K, the result is a positive torque differential represented by T which tends to turn the helicopter toward the left, that is, in the direction opposite to the clockwise direction of rotation of the right rotor. It will be understood that the described differential pitch changes, being equal, do not materally change the total lift or thrust.

Again assuming forward flight and assuming level flight, both rotors are at the collective pitch represented by the point P on the curve L. Again taking a left turn as an example, the pitch of the right rotor may be increased by 1° to the point P' and the pitch of the left rotor may be decreased by 1° to the point P''. Due to the inclination of the curve L the result is a positive torque differential represented by U which tends to turn the helicopter toward the left. The torque differential U is less than the torque differential T, but is nevertheless ample.

Again assuming forward flight and assuming descent at 400 feet per minute, both rotors are at the collective pitch represented by the point Q on the curve M. Again taking a left turn as an example, the pitch of the right rotor may be increased 1° to the point Q' and the pitch of the left rotor may be decreased by 1° to the point Q''. Due to the levelling of the curve M, the points Q' and Q'' are on the same horizontal line V and there is no torque differential. Under this condition the differential collective pitch has no tendency to turn the helicopter and it is primarily for this reason that the before-described differential cyclic pitch mechanism is provided. The said differential cyclic pitch mechanism gives the pilot full control of the direction of flight, even during the transition stage represented by the point Q wherein the differential collective pitch mechanism is ineffective.

Once more assuming forward flight and assuming autorotative descent at 1600 feet per minute, the rotors are at the collective pitch represented by the point R on the curve N. Again taking a left turn as an example and assuming (merely for purposes of explanation) that no differential collective pitch reversing mechanism is provided, the pitch of the right rotor may be increased by 1° to the point R' and the pitch of the left rotor may be decreased by 1° to the point R''. Due to the reversed inclination of the curve N, the result would be a negative torque differential represented by W which would tend to turn the helicopter toward the right, that is, in the direction opposite to that required. However, with the differential collective pitch reversing mechanism in its motion reversing position, as shown in Fig. 22, the pitch of the right rotor is decreased by 1° to the point R'' and the pitch of the left rotor is increased by 1° to the point R'. This reverses the torque differential W from negative to positive and the said torque differential tends to turn the helicopter toward the left as is required.

The transition stage represented by the point Q is ordinarily reached with the collective pitch stick 33 at or near its neutral position as shown in Fig. 10. The differential collective pitch reversing mechanism is still in its normal position as shown in Fig. 10. If descent at a greater rate of speed is desired or becomes necessary by reason of motor failure, the pilot quickly moves the stick 33 forward and downward to further decrease the collective pitch of the blades and to bring the reversing mechanism into its reversing position as shown in Fig. 22. Full autorotative flight is then attained.

For simplicity it has been assumed throughout the foregoing explanation that the rotors are maintained at constant speed. However, substantial variations in rotor speed may be desirable or necessary, particularly during autorotative descent. Such variations may be readily effected by the pilot.

In summary as to directional control, it will be apparent that during normal power-on flight, the direction is controlled cooperatively by the rudder, if provided, by the differential cyclic pitch mechanism, and by the differential collective pitch mechanism. The differential collective pitch motion reversing mechanism becomes effective whenever the collective pitch stick 33 is moved to the position for autorotative descent, the blades and flaps being in a relationship such as that shown in Fig. 17. The rotors are rotating in the directions indicated in Fig. 14.

For a left turn during normal power-on flight the collective pitch in the right rotor is relatively increased and the collective pitch of the left rotor is relatively decreased. This gives a positive torque differential tending to turn the helicopter toward the left. With increased collective pitch the right rotor tends to rotate at a lower speed. However, the two rotors are connected by the gearing for rotation at the same speed, and the right rotor is maintained at the established speed by the left rotor which has a decreased collective pitch and which therefore tends to rotate at a higher speed. Thus the rotation of the left rotor is resisted by the right rotor and the reaction through the gearing tends to turn the helicopter in the direction of rotation of the left rotor, that is, counterclockwise or toward the left. For a right turn during normal power-on flight the described operations are reversed.

For a left turn or a right turn during a transition stage of partial power descent, the helicopter is turned by the rudder, if provided, and by the differential cyclic pitch. For reasons previously explained, the differential collective pitch is not effective during the transition stage.

For a left turn during autorotative descent the collective pitch in the right rotor is relatively decreased, and the collective pitch of the left rotor is relatively increased. This action by reason of the described reversing mechanism is the reverse of that above-described for normal power-on flight and it also gives a positive torque differential tending to turn the helicopter toward the left. With decreased collective pitch, the right rotor tends to rotate at a lower speed, the lower speed being due to the fact that the rotors are being rotated aerodynamically and not by the motor. However, the two rotors are connected by the gearing for rotation at the same speed, and the right rotor is maintained at the established speed by the left rotor which has an increased collective pitch and tends to rotate at a higher speed. Thus the rotation of the left rotor is resisted by the right rotor and the reaction through the gearing tends to turn the helicopter in the direction of rotation of the left rotor, that is, counterclockwise or toward the left. For a right turn during autorotative descent the described operations are reversed.

General summary of operation

With the motor in operation at idling speed, the centrifugal clutch does not drive the rotors. When the motor speed is increased the shoes 47 engage the drum 46 to transmit power for driving the rotors. Initially the blades and flaps are in the relationship shown in Fig. 15.

The collective pitch stick 33 is moved upward and rearward for upward movement of the helicopter. As the stick is so moved the basic collective pitches of the blades of both rotors are increased in unison. The blades swing relatively rearward about the pivotal axes at 86, 86, the extent of such swinging being dependent on the amount of the collective pitch. By reason of suitable mechanism, such as the particular construction of the flap moving connections as explained in connection with Fig. 17A, the collective pitches of the blades are additionally increased and decreased automatically in accordance with increases and decreases in rotor speed.

For a straight vertical lift, the cyclic pitch stick 34 remains in neutral position and the blades have no cyclic pitch, and with no cyclic pitch the rotors have little or no tendency to oscillate about the transverse axes at 78. For hovering or for level flight the stick 33 is held at a position such that the required altitude is maintained.

For horizontal flight, the cyclic pitch stick 34 is inclined in the direction of the desired flight, thus causing cyclic pitch changes which cause the helicopter to travel in the direction of stick movement. The helicopter may be caused to move in any desired direction.

By reason of cyclic variations in pitch, the blades oscillate during each revolution in the plane of rotation and about the pivotal axes at 86, 86. The two blades of each rotor do not oscillate in unison. The friction links 89 permit separate oscillations, but serve to restrain or limit such oscillations.

For normal forward flight the direction is controlled by the foot pedals 35 and 36, constituting the direction control device. For a left turn, the left foot pedal serves to relatively increase the collective pitch of the right rotor and also to relatively increase the cyclic pitch of the right rotor. At the same time the rudder is turned toward the left. For a right turn, the right foot pedal serves to relatively increase the collective pitch of the left rotor and also to relatively increase the cyclic pitch of the left rotor. At the same time the rudder is turned toward the right. The foot pedals, in relatively increasing the collective pitch in one rotor or in the other rotor, turn the flaps upward and clockwise as viewed in Fig. 16.

For autorotative descent, the collective pitch stick 33 is moved forward and downward so that the blades and flaps have a general relationship such as that shown in Fig. 17. The blades rotate in the same directions and are in autorotative equilibrium as has been fully explained. The uni-directional clutch 58 permits the rotors to rotate independently of the motor.

In order to effect turning during autorotative descent by changing the collective pitches, it is necessary for a left turn to relatively decrease the collective pitch in the right rotor and it is necessary for a right turn to relatively decrease the collective pitch in the left rotor. The forward and downward movement of the stick 33 beyond the position shown in Fig. 10 causes the reversing mechanism 358 to become effective as shown in Fig. 22 for reversing the motion transmitted from the foot pedals to the flaps. With the reversing mechanism effective, the flaps are turned downward or counter-clockwise as shown in Fig. 17, rather than upward and clockwise, thus relatively decreasing the blade pitch in the right rotor for a left turn or in the left rotor for a right turn.

The invention claimed is:

1. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism connected with the several pitch changing means and operable during rotor rotation for changing to the same extents the basic collective pitches of the blades of both rotors to control vertical movement which mechanism serves to provide blade pitches suitable for normal power-on flight and to provide blade pitches suitable for autorotation during descent, a direction control device, mechanism connected with the direction control device and with the several pitch changing means and operable for differentially changing the collective pitches of the blades of the two rotors to relatively increase the collective pitch in either of them and thereby change the direction of flight which mechanism during power-on rotation of the rotors is controlled by movements of the direction control device in predetermined directions corresponding to the desired changes in the direction of flight, and means connected with the last said mechanism and operable during autorotation of the rotors for reversing the motion transmitting effect of the last said mechanism and for thus reversing the sense of the differential changes in the collective pitches of the blades of the two rotors upon movement of the direction control device in the said predetermined directions.

2. The combination in a helicopter as set forth in claim 1, wherein the axes of the two rotors are spaced transversely with respect to the direction of normal forward flight.

3. The combination in a helicopter as set forth in claim 1, wherein the several blades are provided respectively with relatively movable servo flaps adapted to act aerodynamically during rotation to change the pitches of the blades, and wherein the said means for changing the pitches of the blades include the said flaps and serve to change the positions of the said flaps relatively to the blades so as to effect the required blade pitch changes.

4. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism connected with the several pitch changing means and operable during rotor rotation for changing to the same extents the basic collective pitches of the blades of both rotors to control vertical movement which mechanism serves to provide blade pitches suitable for normal power-on flight and to provide blade pitches suitable for autorotation during descent, a direction control device, mechanism connected with the direction control device and with the several pitch changing means and operable for differentially changing the collective pitches of the blades of the two rotors to relatively increase the collective pitch in either of them and thereby change the direction of flight which mechanism during power-on rotation of the rotors is controlled by movements of the direction control device in predetermined directions corresponding to the desired changes in the direction of flight, means connected with the last said mechanism for reversing the motion transmitting effect of the last said machanism and for thus reversing the sense of the differential changes in the collective pitches of the blades of the two rotors upon movement of the direction control device in the said predetermined directions, and means connected with and operated by the said basic collective pitch changing mechanism for causing the said reversing means to be operative for reversing the sense of the differential pitch changes when the blades have pitches suitable for autorotative rotation and for causing the said means to be inoperative for the last said purpose when the blades have pitches suitable for normal power-on flight.

5. In a helicopter, the combination of two rotors rotatable about substantially vertical axes and connected for rotation in unison in opposite directions, each of said rotors comprising blades adjustable to change the pitches thereof and each having mounted thereon a pitch adjusting mechanism connected to said blades, a first pilot operated device connected to said pitch adjusting mechanisms for simultaneously producing uniform collective pitch changes in both rotors, first means connected to said pitch adjusting mechanisms for simultaneously producing differential collective pitch changes in both rotors, a second pilot operated device, second means interconnecting said first means and said second pilot operated device for transmitting control motions therebetween, and reversing means connected to said second means adjustable to reverse the motion transmitting effect between said second pilot operated device and said first means.

6. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism including a pilot operable device and connected with the several pitch changing means and operable during rotor rotation for changing to the same extents the basic collective pitches of the blades of both rotors to control vertical movement which mechanism serves to provide blade pitches suitable for normal power-on flight and to provide blade pitches suitable for autorotation during descent, mechanism including a pilot operable direction control device separate from and movable independently of the first said pilot operable device which mechanism is connected with the several pitch changing means and is operable for differentially changing the collective pitches of the blades of the two rotors during power-on rotor rotation to change the direction of flight, the last said mechanism being operable upon movements of the said direction control device in predetermined directions corresponding to the desired changes in the direction of flight, and means connected with the last said mechanism and operable during autorotation of the rotors for reversing the motion transmitting effect of the last said mechanism and for thus reversing the sense of the differential changes in the collective pitches of the blades of the two rotors upon movement of the direction control device in the said predetermined directions.

7. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism including means enabling the rotors to automatically rotate in the said predetermined directions independently of the motor, mechanism including a pilot operable device and connected with the several pitch changing means and operable during rotor rotation for changing to the same extents the basic collective pitches of the blades of both rotors to control vertical movement which mechanism serves to provide blade pitches suitable for normal power-on flight and to provide blade pitches suitable for autorotation during descent, mechanism including a pilot operable direction control device separate from and movable independently of the first said pilot operable device which mechanism is connected with the several pitch changing means and is operable for differentially changing the collective pitches of the blades of the two rotors during power-on rotor rotation to change the direction of flight, the last said mechanism being operable upon movements of the said direction control device in predetermined directions corresponding to the desired changes in the direction of flight, means connected with the last said mechanism for reversing the motion transmitting effect of the last said mechanism and for thus reversing the sense of the differential changes in the collective pitches of the blades of the two rotors upon movement of the direction control device in the said predetermined directions, and means connected with and operable by the first said pilot operable device for causing the said reversing means to be operative for reversing the sense of the differential pitch changes when the blades have pitches suitable for autorotative rotation and for causing the said means to be inoperative for the last said purpose when the blades have pitches suitable for normal power-on flight.

8. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism connected with the several pitch changing means and operable during rotor rotation for changing to the same extents the basic collective pitches of the blades of both rotors to control vertical movement which mechanism serves to provide blade pitches suitable for normal power-on rotation and to provide pitches suitable for autorotation during descent, means connected with the rotor blades and acting supplementally to the last said mechanism for automatically decreasing and increasing the collective pitches of the blades of both rotors to the same extents upon changes from power-on rotation to autorotation and from autorotation to power-on rotation, a direction control device, mechanism connected with the direction control device and with the several pitch changing means and operable for differentially changing the collective pitches of the blades of the two rotors to relatively increase the collective pitch in either of them and thereby change the direction of flight which mechanism during power-on rotation of the rotors is controlled by movements of the direction control device in predetermined directions corresponding to the desired changes in the direction of flight, and means connected with the last said mechanism and operable during autorotation of the rotors for reversing the motion transmitting effect of the last said mechanism and for thus reversing the sense of the differential changes in the collective pitches of the blades of the two rotors upon movement of the direction control device in the said predetermined directions.

9. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism connected with the several pitch changing means and operable during rotor rotation for changing to the same extents the basic collective pitches of the blades of both rotors to control vertical movement which mechanism serves to provide blade pitches suitable for normal power-on flight and to provide blade pitches suitable for autorotation during descent, mechanism connected with the several pitch changing means and operable during rotor rotation for changing the pitches of the blades of both rotors cyclically and to the same extents to control horizontal movement, a direction control device, mechanism operable for differentially changing the collective pitches of the blades of the two rotors to relatively increase the collective pitch in either of them and thereby change the direction of flight which mechanism during power-on rotation of the rotors is controlled by movements of the direction control device in predetermined directions corresponding to the desired changes in the direction of flight, and means connected with the last said mechanism and operable during autorotation of the rotors for reversing the differential motion transmitting effect of the last said mechanism and for thus reversing the sense of the changes in the collective pitches of the blades of the two rotors upon movement of the direction control device in the said predetermined directions.

10. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism including means enabling the rotors to automatically rotate in the said predetermined directions independently of the motor, mechanism connected with the several pitch changing means and operable during rotor rotation for changing to the same extents the basic collective pitches of the blades of both rotors to control vertical movement which mechanism serves to provide blade pitches suitable for normal power-on flight and to provide blade pitches suitable for autorotation during descent, mechanism connected with the several pitch changing means and operable during rotor rotation for changing the pitches of the blades of both rotors cyclically and to the same extents to control horizontal movement, a direction control device, mechanism connected with the direction control device and with the several pitch changing means and operable for differentially changing the collective pitches of the blades of the two rotors to relatively increase the collective pitch in either of them and thereby change the direction of flight which mechanism during power-on rotation of the rotors is controlled by movements of the direction control device in predetermined directions corresponding to the desired changes in the direction of flight, means cooperating with the last said mechanism for reversing the motion transmitting effect of the last said mechanism and for thus reversing the sense of the differential changes in the collective pitches of the blades of the two rotors upon movement of the direction control device in the said predetermined directions, and means connected with and operated by the said basic pitch changing mechanism for causing the said reversing means to be operative for reversing the sense of the differential pitch changes when the blades have pitches suitable for autorotative rotation and for causing the said means to be inoperative for the last said purpose when the blades have pitches suitable for normal power-on flight.

11. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism including a pilot operable device and connected with the several pitch changing means which mechanism is operable during rotor rotation for changing to the same extents the basic collective pitches of the blades of both rotors to control vertical movement which mechanism serves to provide blade pitches suitable for normal power-on flight and to provide blade pitches suitable for autorotation during descent, mechanism connected with the several pitch changing means for changing the pitches of the blades of both rotors cyclically during rotation and to the same extents to control horizontal movement, mechanism including a pilot operable direction control device separate from and movable independently of the first said pilot operable device which mechanism is connected with the several pitch changing means and is operable for differentially changing the collective pitches of the blades of the two rotors during power-on rotor rotation to change the direction of flight, the said mechanism being operable upon movements of the said directional control device in predetermined directions corresponding to the desired changes in the direction of flight, and means connected with the last said mechanism and operable during autorotation of the rotors for reversing the motion transmitting effect of the last said mechanism and for thus reversing the sense of the differential changes in the collective pitches of the blades of the two rotors upon movement of the said direction control device in the said predetermined directions.

12. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism including a pilot operable device and connected with the several pitch changing means which mechanism is operable during rotor rotation for changing to the same extents the basic collective pitches of the blades of both rotors to control vertical movement which mechanism serves to provide blade pitches suitable for normal power-on flight and to provide blade pitches suitable for autorotation during descent, mechanism including a second pilot operable device movable independently of the first said pilot operable device which mechanism is connected with the several pitch changing means and is operable during rotor rotation for changing the pitches of the blades of both rotors cyclically and to the same extents to control horizontal movement, mechanism including a pilot operable direction control device separate from and movable independently of the first and second said pilot operable devices which mechanism is connected with the several pitch changing means and is operable during power-on rotation of the rotors for differentially changing the collective pitches of the blades of the two rotors to change the direction of flight, the last said mechanism being operable upon movements of the said direction control device in predetermined directions corresponding to the desired changes in the direction of flight, and means connected with the last said mechanism and operable during autorotation of the rotors for reversing the motion transmitting effect of the last said mechanism and for thus reversing the sense of the differential changes in the collective pitches of the blades of the two rotors upon movement of the direction control device in the said predetermined directions.

13. The combination in a helicopter as set forth in claim 12, wherein means is provided which is connected with and operable by the first said pilot operable device for causing the said reversing means to be operative for reversing the sense of the differential pitch changes when the blades have pitches suitable for autorotative rotation and for causing the said means to be inoperative for the last said purpose when the blades have pitches suitable for normal power-on flight.

14. In a helicopter, the combination of two rotors rotatable in opposite directions about substantially vertical axes and having blades adjustable to change the pitches thereof collectively and cyclically, a plurality of means connected respectively with the blades for changing the pitches thereof, mechanism connected with the several pitch changing means and operable for differentially changing the collective pitches of the blades of the rotors in one sense in order to change the direction of flight during power-on rotation of the rotors which mechanism includes a direction control device movable in predetermined directions corresponding to the desired changes in the direction of flight, mechanism connected with the several pitch changing means and operable for differentially changing the collective pitches of the blades of the two rotors in the opposite sense in order to change the direction of flight during autorotation of the rotors which last said mechanism is connected to and controlled by the said direction control device of the first said mechanism for differentially changing the said collective pitches in the said opposite sense upon movement of the control device in the same predetermined directions, and mechanism connected with the several pitch changing means and operable for differentially changing the cyclic pitches of the blades of the rotors in order to change the direction of flight during the transition stage between power-on rotation and autorotation.

15. The combination in a helicopter as set forth in claim 14, wherein the said mechanism for differentially changing the cyclic pitches of the blades during the said transition stage is connected with and is operable by the said direction control device.

16. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism connected with the several pitch changing means and operable during rotor rotation for changing to the same extents the basic collective pitches of the blades of both rotors to control vertical movement which mechanism serves to provide blade pitches suitable for normal power-on rotation and to provide blade pitches suitable for autorotation during descent, mechanism including a direction control device which mechanism is connected with the several pitch changing means and is operable for differentially changing the collective pitches of the blades of the two rotors during power-on rotor rotation to change the direction of flight, the last said mechanism being operable upon movements of the direction control device in predetermined directions corresponding to the desired changes in the direction of flight, means connected with the last said mechanism and operable during autorotation of the rotors for reversing the motion transmitting effect of the last said mechanism and for thus reversing the sense of the differential changes in the collective pitches of the blades upon movement of the said direction control device in the said predetermined directions, and mechanism connected with the several pitch changing means and with the said direction control device and operable by the latter for differentially changing the cyclic pitches of the blades of the two rotors simultaneously with the changes in differential collective pitches to cooperate in changing the direction of flight.

17. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to automatically rotate in the said predetermined directions independently of power derived from the motor, mechanism connected with the several pitch changing means and operable during rotor rotation for changing to the same extents the basic collective pitches of the blades of both rotors to control vertical movement which mechanism serves to provide blade pitches suitable for normal power-on rotation and to provide blade pitches suitable for autorotation during descent, mechanism including a direction control device connected with the several pitch changing means and operable during power-on rotor rotation for differentially changing the collective pitches of the blades of the two rotors in one sense to change the direction of flight which mechanism is operable upon movements of the direction control device in predetermined directions corresponding to the desired changes in the direction of flight, means connected with the last said mechanism and operable during autorotation of the rotors for reversing the motion transmitting effect of the said mechanism and for thus reversing the sense of the differential changes in the collective pitches of the blades upon movement of the said direction control device in the said predetermined directions, means connected with and operated by the said collective pitch changing mechanism for causing the said reversing means to be operative for reversing the sense of the differential collective pitch changes when the blades have pitches suitable for autorotative rotation and for causing the said means to be inoperative for the said purpose when the blades have pitches suitable for normal power-on flight, and mechanism connected with and operable by the said direction control device for differentially changing the cyclic pitches of the blades of the two rotors simultaneously with the changes in differential collective pitches to cooperate in changing the direction of flight.

18. The combination in a helicopter as set forth in claim 17, wherein the several blades are provided respectively with relatively movable servo flaps adapted to act aerodynamically during rotation to change the pitches of the blades, and wherein the said means for changing the pitches of the blades include the several flaps and serve to change the positions of the said flaps relatively to the blades so as to effect the required blade pitch changes.

19. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism enabling the rotors to autoamtically rotate in the said predetermined directions independently of power derived from the motor, mechanism including a pilot operable device and connected with the several pitch changing means and operable during rotor rotation for changing to the same extents the basic collective pitches of the blades of both rotors to control vertical movement which mechanism serves to provide blade pitches suitable for normal power-on flight and to provide blade pitches suitable for autorotation during descent, mechanism connected with the several pitch changing means and operable during rotor rotation for changing pitches of the blades of both rotors cyclically and to the same extents to control horizontal movement, mechanism including a pilot operable direction control device separate from and movable independently of the first said pilot operable device which mechanism is connected with the several pitch changing means and is operable during rotor rotation for differentially changing the cyclic pitches of the blades of the two rotors to change the direction of flight, mechanism connected with the last said pilot operable direction control device and operable thereby during power-on rotor rotation for differentially changing the collective pitches of the blades of the two rotors to change the direction of flight which mechanism is operable upon movements of the said direction control device in predetermined directions corresponding to the desired changes in the direction of flight, and means connected with the last said mechanism and operable during autorotation of the rotors for reversing the motion transmitting effect of the last said mechanism and for thus reversing the sense of the differential changes in the collective pitches of the blades of the two rotors upon movement of the said direction control device in the said predetermined directions.

20. In a helicopter, the combination of two rotors rotatable about substantially vertical axes and connected for rotation in unison and in opposite directions, each of the said rotors comprising a plurality of aerofoil blades independently adjustable to change the pitches thereof, a plurality of means connected respectively with the blades for changing the pitches thereof, a motor, power transmitting mechanism connected with the motor and the rotors and interposed between them for driving the latter in predetermined directions for normal flight, the said mechanism including means enabling the rotors to automatically rotate in the said predetermined directions independently of the motor, mechanism including a pilot operable device and connected with the several pitch changing means and operable during rotor rotation for changing to the same extents the basic collective pitches of the blades of both rotors to control vertical movement which mechanism serves to provide blade pitches suitable for normal power-on rotation and to provide pitches suitable for autorotation during descent, mechanism including a second pilot operable device separate from and operable independently of the first said pilot operable device which mechanism is connected with the several pitch changing means and is operable during rotor rotation for changing the pitches of the blades of both rotors cyclically and to the same extents to control horizontal flight, mechanism including a pilot operable direction control device separate from and operable independently of the first and second said pilot operable devices which mechanism is connected with the several pitch changing means and is operable during power-on rotor rotation for differentially changing the collective pitches of the blades of the two rotors to change the direction of flight which mechanism is operable upon movements of the pilot operable direction control device in predetermined directions corresponding to the desired changes in the direction of flight, means connected with the last said mechanism and operable during autorotation of the rotors for reversing the motion transmitting effect of the said mechanism and for thus reversing the sense of the differential changes in the collective pitches of the blades upon movement of the said pilot operable direction control device in the said predetermined directions, and mechanism connected with and operable by the said pilot operable direction control device for differentially changing the cyclic pitches of the blades of two rotors simultaneously with the changes in differential collective pitches to cooperate in changing the direction of flight.

21. In a control mechanism for a helicopter including two substantially vertical shafts and including two rotors connected with the respective shafts and each having at least one blade adjustable to change the pitch thereof and each having blade pitch changing means thereon, the combination of a differential pitch shaft movable about its own axis, pilot controlled means connected with the shaft for moving it, two arms rigidly connected with the shaft for movement therewith, two levers pivotally connected respectively with the said arms and movable substantially in unison therewith and also relatively thereto which levers are connected respectively with the pitch changing means on the corresponding rotors for collectively changing the pitches of the blades of the said rotors, the said levers serving to change the said pitches in unison and to the same extents when the said arms and the said levers are moved substantially in unison, and pilot controlled mechanism operable independently of the said arms and connected to the levers for pivotally moving them in opposite directions relatively to the respective arms and for thereby differentially changing the collective pitches of the blades of the respective rotors.

22. In a control mechanism for a helicopter including two substantially vertical shafts and including two rotors connected with the respective shafts and each having at least one blade adjustable to change the pitch thereof and each having blade pitch changing means thereon, the combination of two arms rigidly connected with each other for pivotal movement in unison about a fixed axis, pilot controlled means directly connected to the said arms for pivotally moving them about the said axis, two levers each pivotally connected at one end with the corresponding arm, two links each pivotally connected with the corresponding lever at an axis spaced from the pivotal connection between the lever and the arm, two links each pivotally connected at one end with the corresponding lever at an axis spaced to a smaller extent from the pivotal connection between the lever and the arm which last said links are connected respectively with the pitch changing means of the corresponding rotors for collectively changing the blade pitches in unison and to the same extents when the said pilot controlled arms are moved and the first said links are stationary, and pilot controlled mechanism operable independently of the said arms and pivotally connected with the opposite ends of the first said links, the said mechanism including means for moving the first said links in opposite directions relatively to the respective arms and for thereby oppositely moving the levers to differentially change the collective pitches of the blades of the respective rotors.

23. In a control mechanism for a helicopter including two substantially vertical shafts and including two rotors connected with the respective shafts and each having at least one blade adjustable to change the pitch thereof and each having blade pitch changing means, the combination of a pilot controlled member movable in opposite directions, a differential collective pitch device connected to the pilot controlled member for movement in unison therewith and also for movement relatively thereto which device is connected to the pitch changing means of the respective rotors, the said device serving for collectively changing the pitches of the blades thereof in unison and to the same extents when the said pilot controlled member and the said device are moved in unison, pilot controlled mechanism operable independently of the said pilot controlled member and connected to the said device for moving it relatively to the said member and for thereby differentially changing the collective pitches of the blades of the respective rotors, and optionally operable means connected to and interposed between the said pilot controlled mechanism and the said differential collective pitch device for reversing the relative movement of the said device with respect to the movement of the said mechanism.

24. In a control mechanism for a helicopter including two substantially vertical shafts and including two rotors connected with the respective shafts and each having at least one blade adjustable to change the pitch thereof and each having blade pitch changing means, the combination of a pilot controlled member movable in opposite directions, a differential collective pitch device connected with the pilot controlled member for movement in unison therewith and also for movement relatively thereto which device is connected with the pitch changing means of the respective rotors for collectively changing the pitches of the blades thereof in unison and to the same extents when the said pilot controlled member and the said device are moved in unison, pilot controlled mechanism operable independently of the said pilot controlled member and connected to the said device for moving it relatively to the said member and for thereby differentially changing the collective pitches of the blades of the respective rotors, means connected to and interposed between the said pilot controlled mechanism and the said differential collective pitch device for reversing the relative movement of the said device with respect to the movement of the said mechanism, and means connected with the said pilot controlled member for causing the said movement reversing means to be operative when the said pilot controlled member is in one position and for causing the said movement reversing means to be inoperative when the said pilot controlled member is in another position.

25. In a control mechanism for a helicopter including two substantially vertical shafts and including two rotors connected with the respective shafts and each having at least one blade adjustable to change the pitch thereof and each having blade pitch hanging means, the combination of a relatively movable differential collective pitch device connected with the pitch changing means of the respective rotors for differentially changing the collective pitches of the blades thereof when the said device is relatively moved, pilot controlled mechanism, a first link connected at one end with the pilot controlled mechanism, a second link connected at one end with said collective pitch device, and mechanism connected with the remaining ends of the said links and having parts movable to either of two operative relationships, the last said mechanism serving in one operative relationship to transmit motion in one direction to the second link from the first link to relatively move the collective pitch device in one direction and serving in the other operative relationship to transmit motion in the opposite direction to the second link from the first link to relatively move the collective pitch device in the opposite direction.

26. The combination as set forth in claim 25, wherein the motion transmitting mechanism includes a pivoted lever connected with the second said link, an intermediate link pivotally connected at one end with the lever and pivotally connected at the other end with the first said link, a strut pivotally connected at one end adjacent the connection between the intermediate link and the first link, a support to which the opposite end of the strut is pivoted, and means for moving the support in a fixed path to positions at opposite sides of a line extending through the pivotal connections of the intermediate link with the lever and with the first said link.

27. The combination as set forth in claim 26, wherein the first and second links are in approximate alignment, wherein the said lever is a bell crank, and wherein the said strut support is a lever pivoted for movement about a fixed axis.

28. In a control mechanism for a helicopter including two substantially vertical shafts and including two rotors connected with the respective shafts and each having at least one blade adjustable to change the pitch thereof and each having blade pitch changing means thereon, the combination of mechanism including a pilot operable stick connected with the pitch changing means of the rotors for uniformly changing the collective pitches of the blades thereof, pilot operable foot pedals, a pivoted cross bar movable by the pedals, a pivoted collective pitch cross bar, means connected to and operable by the collective pitch cross bar and connected with the pitch changing means of the rotors for differentially changing the collective pitches of the blades thereof, and means connecting the two cross bars and optionally serving either to move the collective pitch cross bar in the same direction as the first cross bar or to move the collective pitch cross bar in the opposite direction.

29. In a control mechanism for a helicopter including two substantially vertical shafts and including two rotors connected with the respective shafts and each having at least one blade adjustable to change the pitch thereof and each having blade pitch changing means thereon, the combination of mechanism including a pilot operable stick connected with the pitch changing means of the rotors for uniformly changing the collective pitches of the blades thereof, pilot operable foot pedals, a pivoted cross bar connected to and movable by the pedals, a pivoted collective pitch cross bar, means connected to and operable by the collective pitch cross bar and connected with the pitch changing means of the rotors for differentially changing the collective pitches of the blades thereof, means connecting the two cross bars and optionally serving either to move the collective pitch cross bar in the same direction as the first cross bar or to move the collective pitch cross bar in the opposite direction, and means connected to the said cross bar connecting means and connected to and operable by the pilot operable collective pitch stick and serving to cause the said cross bar connecting means to move the collective pitch cross bar in one direction when the said stick is in one position and serving to cause the said cross bar connecting means to move the collective pitch cross bar in the opposite direction when the said stick is in another position.

30. In a control mechanism for a helicopter including two substantially vertical shafts and including two rotors connected with the respective shafts and each having at least one blade adjustable to change the pitch thereof and each having blade pitch changing means thereon, the combination of mechanism including a pilot operable stick connected with the pitch changing means of the rotors for uniformly changing the cyclic pitches of the blades thereof, mechanism including a pilot operable stick connected with the pitch changing means of the rotors for uniformly changing the collective pitches of the blades thereof, pilot operable foot pedals, a pivoted cross bar connected to and operable by the pedals, a pivoted cyclic pitch cross bar connected with the first cross bar for movement in unison therewith, means connected to and operable by the cyclic pitch cross bar and connected with the pitch changing means of the rotors for differentially changing the cyclic pitches of the blades thereof, a pivoted collective pitch cross bar, means connected to and operable by the collective pitch cross bar and connected with the pitch changing means of the rotors for differentially changing the collective pitches of the blades thereof, and means connecting the pedal operable cross bar and the collective pitch cross bar and optionally serving either to move the collective pitch cross bar in the same direction as the pedal operable cross bar or to move the collective pitch cross bar in the opposite direction.

31. In a control mechanism for a helicopter including two substantially vertical shafts and including two rotors connected with the respective shafts and each having at least one blade adjustable to change the pitch thereof and each having a blade pitch changing means thereon, the combination of mechanism including a pilot operable stick connected with the pitch changing means of the rotors for uniformly changing the collective pitches of the blades thereof, pilot operable foot pedals, a pivoted cross bar connected to and operable by the pedals, a pivoted cyclic pitch cross bar connected with the first cross bar for movement in unison therewith, means connected to and operable by the cyclic pitch cross bar and connected with the pitch changing means of the rotors for differentially changing the cyclic pitches of the blades thereof, a pivoted collective pitch cross bar, means connected to and operable by the collective pitch cross bar and connected with the pitch changing means of the rotors for differentially changing the collective pitches of the blades thereof, means connecting the pedal operable cross bar and the collective pitch cross bar and serving either to move the collective pitch cross bar in the same direction as the pedal operable cross bar or to move the collective pitch cross bar in the opposite direction, and means connected to the said cross bar connecting means and connected to and operable by the collective pitch stick and serving to cause the said cross bar connecting means to move the collective pitch cross bar in one direction when the said stick is in one position and serving to cause the said cross bar connecting means to move the collective pitch cross bar in the opposite direction when the said stick is in another position.

References Cited in the file of this patent

UNITED STATES PATENTS

| Number | Name | Date |
| --- | --- | --- |
| 1,350,982 | Beurrier | Aug. 24, 1920 |
| 1,526,230 | Pescara | Feb. 10, 1925 |
| 1,830,731 | Wylie | Nov. 3, 1931 |
| 1,915,855 | Hess | June 27, 1933 |
| 1,986,709 | Breguet | Jan. 1, 1935 |
| 2,021,470 | Upson | Nov. 19, 1935 |
| 2,280,654 | Mader | Apr. 21, 1942 |
| 2,321,572 | Campbell | June 15, 1943 |
| 2,330,842 | Pullin | Oct. 5, 1943 |
| 2,337,570 | Pullin | Dec. 28, 1943 |
| 2,369,048 | Hays | Feb. 6, 1945 |
| 2,371,687 | Gerhardt | Mar. 20, 1945 |
| 2,373,575 | Lemonier | Apr. 10, 1945 |
| 2,397,489 | Jenkins | Apr. 2, 1946 |
| 2,416,375 | Bunyard | Feb. 25, 1947 |
| 2,432,677 | Platt | Dec. 16, 1947 |
| 2,441,920 | Platt | May 18, 1948 |
| 2,443,393 | Landgraff | June 15, 1948 |
| 2,443,808 | Stalker | June 22, 1948 |
| 2,455,866 | Kaman | Dec. 7, 1948 |
| 2,494,985 | Campbell | Jan. 17, 1950 |

FOREIGN PATENTS

| Number | Country | Date |
| --- | --- | --- |
| 936,056 | France | Feb. 16, 1948 |